United States Patent
Hoshino

(10) Patent No.: US 8,861,025 B2
(45) Date of Patent: Oct. 14, 2014

(54) COLOR ADJUSTMENT METHOD, COLOR ADJUSTMENT APPARATUS AND COMPUTER READABLE MEDIUM STORING COLOR ADJUSTMENT PROGRAM

(71) Applicant: Konica Minolta, Inc., Tokyo (JP)

(72) Inventor: Toru Hoshino, Nakano-ku (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 97 days.

(21) Appl. No.: 13/655,273

(22) Filed: Oct. 18, 2012

(65) Prior Publication Data
US 2013/0100468 A1 Apr. 25, 2013

(30) Foreign Application Priority Data
Oct. 21, 2011 (JP) ................................. 2011-231379

(51) Int. Cl.
*H04N 1/60* (2006.01)
(52) U.S. Cl.
CPC .................................... *H04N 1/603* (2013.01)
USPC ............................ 358/1.9; 358/3.23; 358/518
(58) Field of Classification Search
None
See application file for complete search history.

(56) References Cited

U.S. PATENT DOCUMENTS

2006/0066925 A1* 3/2006 Hasegawa et al. ............ 358/518
2006/0203270 A1* 9/2006 Shirasawa ..................... 358/1.9

FOREIGN PATENT DOCUMENTS

| JP | 2001-045310 | 2/2001 |
| JP | 2005-260777 | 9/2005 |
| JP | 2007-035459 | 2/2007 |
| JP | 2007-324900 | 12/2007 |
| JP | 2008-271275 | 6/2008 |
| JP | 2010-263368 | 11/2010 |

* cited by examiner

*Primary Examiner* — Kimberly A Williams
(74) *Attorney, Agent, or Firm* — Buchanan Ingersoll & Rooney PC

(57) ABSTRACT

Disclosed is a color adjustment method including color converting to obtain output CMYK values corresponding to an object indicated by input image data from the input image data by using a color conversion table for converting the input image data to the output CMYK values which is created on the basis of an output device profile. The color adjustment method further includes color adjusting to obtain adjusted CMYK values from the output CMYK values by using a color adjustment table for converting the output CMYK values to the adjusted CMYK values, the color adjustment table is created on the basis of a third conversion table for converting the color value indicating the coordinate in the device-independent color space to the adjusted CMYK values and the first conversion table.

24 Claims, 33 Drawing Sheets

FIG.2

FOR COATED PAPER

| SOURCE PROFILE | RGB SOURCE PROFILE |
| --- | --- |
| | CMYK SOURCE PROFILE |
| | PRINTER PROFILE(FOR COATED PAPER) |
| DEVICE LINK PROFILE (DLP) | DLP FOR RGB-CMYK IMAGE(FOR COATED PAPER) |
| | DLP FOR RGB-CMYK GRAPHIC(FOR COATED PAPER) |
| | DLP FOR RGB-CMYK TEXT(FOR COATED PAPER) |
| | DLP FOR CMYK-CMYK IMAGE(FOR COATED PAPER) |
| | DLP FOR CMYK-CMYK GRAPHIC(FOR COATED PAPER) |
| | DLP FOR CMYK-CMYK TEXT(FOR COATED PAPER) |
| COLOR ADJUSTMENT TABLE | TABLE FOR 5% SAVING(FOR COATED PAPER) |
| | TABLE FOR 10% SAVING(FOR COATED PAPER) |
| | TABLE FOR 20% SAVING(FOR COATED PAPER) |

FOR REGULAR PAPER

| SOURCE PROFILE | RGB SOURCE PROFILE |
| --- | --- |
| | CMYK SOURCE PROFILE |
| | PRINTER PROFILE(FOR REGULAR PAPER) |
| DEVICE LINK PROFILE (DLP) | DLP FOR RGB-CMYK IMAGE(FOR REGULAR PAPER) |
| | DLP FOR RGB-CMYK GRAPHIC(FOR REGULAR PAPER) |
| | DLP FOR RGB-CMYK TEXT(FOR REGULAR PAPER) |
| | DLP FOR CMYK-CMYK IMAGE(FOR REGULAR PAPER) |
| | DLP FOR CMYK-CMYK GRAPHIC(FOR REGULAR PAPER) |
| | DLP FOR CMYK-CMYK TEXT(FOR REGULAR PAPER) |
| COLOR ADJUSTMENT TABLE | TABLE FOR 5% SAVING(FOR REGULAR PAPER) |
| | TABLE FOR 10% SAVING(FOR REGULAR PAPER) |
| | TABLE FOR 20% SAVING(FOR REGULAR PAPER) |

⋮

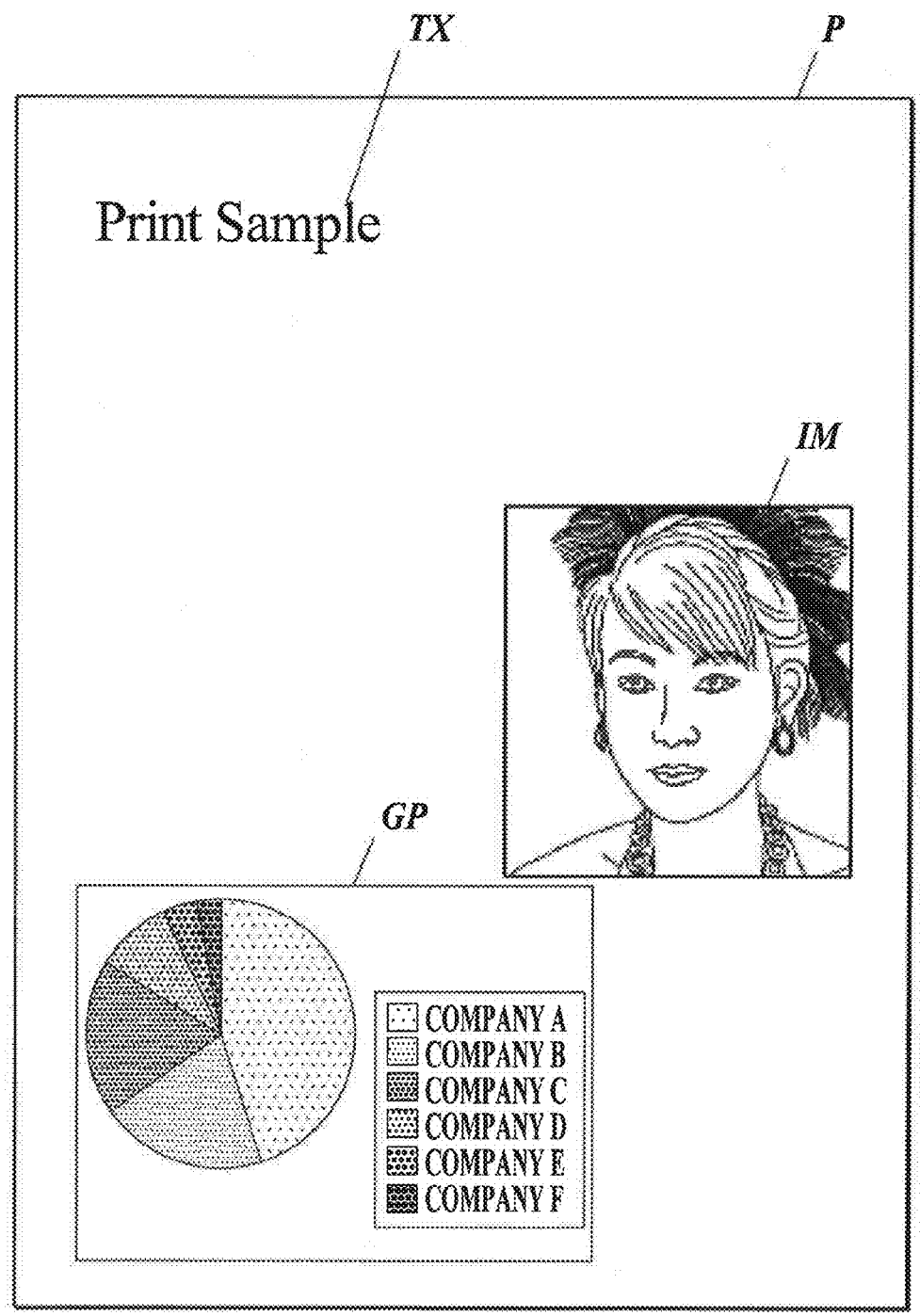

FIG. 7
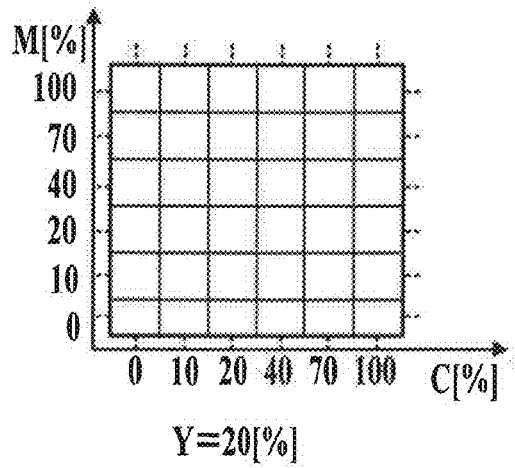
Y=20[%]
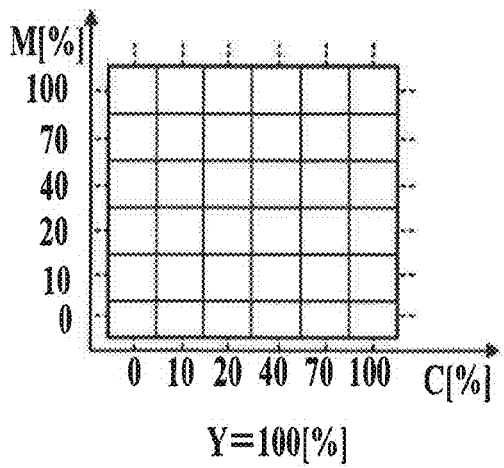
Y=100[%]
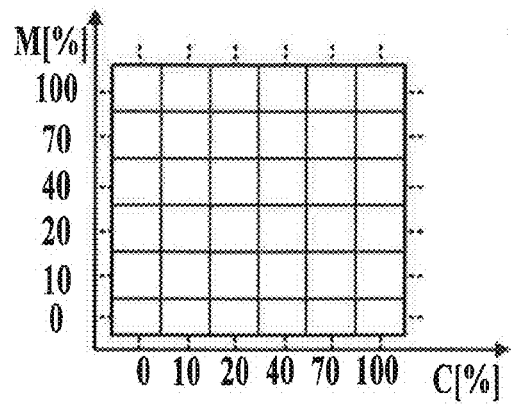
Y=10[%]
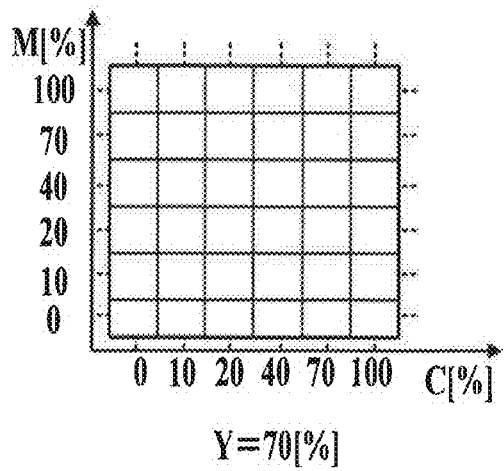
Y=70[%]
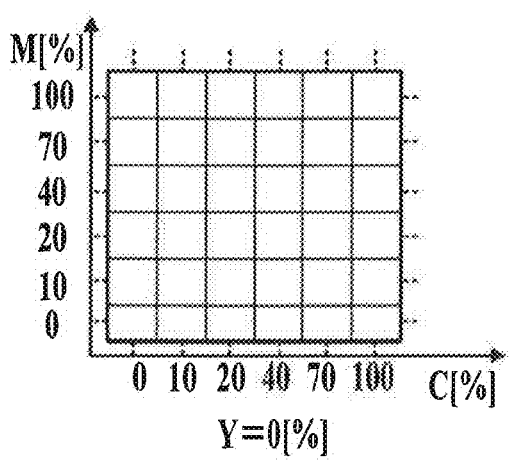
Y=0[%]
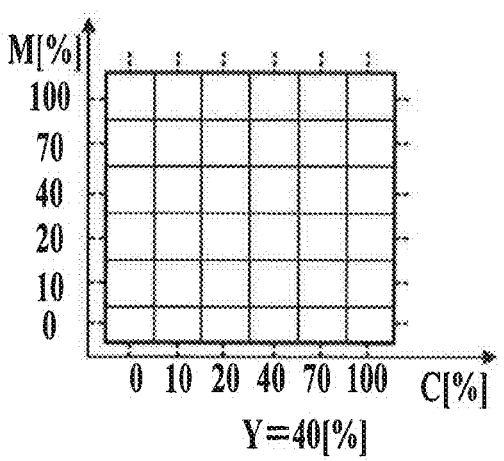
Y=40[%]

FIG.26

1. NAME SETTING
PLEASE SPECIFY NAME AND STORAGE LOCATION OF PROFILE SET
PLEASE PRESS "NEXT" AFTER INPUT IS COMPLETED

STORAGE LOCATION
NAME OF PROFILE SET
PAPER A_JapanColor2001_sRGB — T1

SAVING PLACE
D:¥00-FOR TEST

NAME OF SAVED FILE
D:¥00-FOR TEST¥PAPER A¥PAPER A_JapanColor2001_sRGB.pfs

REFERENCE — B5

INTERRUPT OPERATION — B3
RETURN — B2
NEXT — B6
CANCEL — B4

2. DECIDE PROFILE TO BE USED

PLEASE NEWLY CREATE PRINTER PROFILE, CMYK TARGET PROFILE AND RGB SOURCE PROFILE OR SELECT FROM PREEXISTING FILES

NAME OF PROFILE SET IN OPERATION
PAPER A_JapanColor2001_sRGB.pfs

PRINTER PROFILE
PROFILE TO BE USED
PAPER A_JapanColor2001_sRGB_printer.icc | REFERENCE (B7)
CREATE NEW (B10)

CMYK TARGET PROFILE
PROFILE TO BE USED
JC2001_type3.icc | REFERENCE (B8)
CREATE NEW (B11)

RGB SOURCE PROFILE
● sRGB
○ Adobe RGB
○ OTHER
sRGB | REFERENCE (B9)

R1

INTERRUPT OPERATION (B3) | RETURN (B2) | NEXT (B12) | CANCEL (B4)

3. SET PROFILE SET

CARRY OUT COLOR CONVERSION SETTING FOR EACH OBJECT TYPE
DEFAULT SETTING IS RECOMMENDED

NAME OF PROFILE SET IN OPERATION
PAPER A_JapanColor2001_sRGB.pts

CMYK-CMYK CONVERSION
RENDERING SETTING
☑ RELATIVE COLORIMETRIC — PD4

CMYK IMAGE
REMOVE MIDDLE ☑K ☐C ☐M ☐Y ☐R ☐G ☐B
PART TURBIDITY
MAINTAIN
SOLID COLORING ☑K ☐C ☐M ☐Y ☐R ☐G ☐B — C1

CMYK GRAPHIC
REMOVE MIDDLE ☑K ☐C ☐M ☐Y ☐R ☐G ☐B
PART TURBIDITY
MAINTAIN
SOLID COLORING ☑K ☐C ☐M ☐Y ☐R ☐G ☐B — C2

CMYK TEXT
REMOVE MIDDLE ☑K ☐C ☐M ☐Y ☐R ☐G ☐B
PART TURBIDITY
MAINTAIN
SOLID COLORING ☑K ☐C ☐M ☐Y ☐R ☐G ☐B — C3

RENDERING SETTING
RGB IMAGE
RENDERING SETTING
PERCEPTUAL — PD5

RGB GRAPHIC
RENDERING SETTING
SATURATION — PD6

CMYK TEXT
RENDERING SETTING
SATURATION — PD7

CONVERSION FOR TONER SAVING
☑ CREATE FROM PRINTER PROFILE — C4

[INTERRUPT OPERATION] B3    [RETURN] B2    [NEXT] B17    [CANCEL] B4

COLOR ADJUSTMENT METHOD, COLOR ADJUSTMENT APPARATUS AND COMPUTER READABLE MEDIUM STORING COLOR ADJUSTMENT PROGRAM

BACKGROUND OF THE INVENTION

1. Field of the Invention

The present invention relates to a color adjustment method, a color adjustment apparatus and a computer readable medium storing a color adjustment program.

2. Description of Related Art

Conventionally, output colors of a color printer are adjusted so as to be the desired colors by a color management system using a device profile.

In such color management system, color conversion using a source profile for converting RGB values/CMYK values of device-dependent color space such as RGB color system and CMYK color system to values of a color system of device-independent color space such as L*a*b* color system and XYZ color system and a destination profile for converting to CMYK values of the color printer which performs output of color space data is carried out.

In recent years, there are cases where image data expressed by RGB values (RGB image data) and image data expressed by CMYK values (CMYK image data) are mixed in one page or in a job that consists of a plurality of pages. Further, there are cases where object type information which indicates image attribution according to attributions of the images is included in RGB image data and CMYK image data. The object type includes image, text and graphic. When color conversion is to be carried out, color system and object type of the image data need to be considered in order to improve reproductively.

In view of the above, JP 2010-263368 discloses a way to obtain an image having great color reproduction accuracy by an output device by appropriately switching between color conversion profiles according to image attribution and the like in a conventional color adjustment method.

SUMMARY OF THE INVENTION

In the above color management system, there is a case where various types of adjustments are performed on CMYK values after their conversion so that the colors to be reproduced be colors which a user desires and in order to save color materials.

However, when many color conversion profiles are used as in the technique described in the above JP 2010-263368, it becomes even more complicated to determine and set how the color adjustments should be carried out using such color conversion profiles to reproduce the colors desired by a user, and this is inconvenient for a user.

In view of the above problem, an object of the present invention is to provide a color adjustment method and a color adjustment apparatus in which adjustments desired by a user can be easily carried out while maintaining great color reproduction accuracy even when there are a number of profiles for color conversions, and a computer readable recording medium storing a program for such color conversion.

In order to realize at least one of the above objects, a color adjustment method reflecting one aspect of the present invention includes color converting to obtain output CMYK values corresponding to an object indicated by input image data from the input image data by using a color conversion table for converting the input image data to the output CMYK values which is created on the basis of an output device profile, the output device profile comprising a first conversion table for converting input CMYK values in an output device to a color value indicating a coordinate in a device-independent color space and a second conversion table for converting the color value indicating the coordinate in the device-independent color space to the output CMYK values wherein the second conversion table includes a plurality of conversion tables which are created so as to correspond respectively to a plurality of types of objects indicating image attributions on the basis of the first conversion table, and color adjusting to obtain adjusted CMYK values from the output CMYK values by using a color adjustment table for converting the output CMYK values to the adjusted CMYK values, the color adjustment table being created on the basis of a third conversion table for converting the color value indicating the coordinate in the device-independent color space to the adjusted CMYK values and the first conversion table, the third conversion table being created in accordance with a predetermined color adjustment condition on the basis of the first conversion table.

Preferably, the color adjustment method further includes selecting which of the output CMYK values obtained in the color converting and the adjusted CMYK values obtained in the color adjusting be CMYK values used by the output device to output an image.

Preferably, the third conversion table includes a conversion table which is created in accordance with a color adjustment condition which is set so that a ratio of a K value with respect to CMYK values be larger when converting the color value indicating the coordinate in the device-independent color space to the adjusted CMYK values by using the conversion table comparing to when converting the color value indicating the coordinate in the device-independent color space to the output CMYK values by using the second conversion table.

Preferably, the color adjustment method further includes selecting any one among a plurality of color adjustment tables, and the color adjustment condition for when creating the third conversion table includes a plurality of types of color adjustment conditions, a plurality of third conversion tables are created so as to correspond respectively to the plurality of types of color adjustment conditions, a plurality of color adjustment tables are created so as to correspond respectively to the plurality of third conversion tables, and the adjusted CMYK values are obtained from the output CMYK values in the color adjusting by using the color adjustment table selected in the selecting.

Preferably, the color adjustment method further includes selecting any one among a plurality of color adjustment tables, and the color adjustment condition for when creating the third conversion table includes a plurality of types of color adjustment conditions, each of the plurality of types of color adjustment conditions is set so that the ratio of the K value with respect to the CMYK values when converting the color value indicating the coordinate in the device-independent color space to the adjusted CMYK values be different from each other, a plurality of third conversion tables are created so as to correspond respectively to the plurality of types of color adjustment conditions, a plurality of color adjustment tables are created so as to correspond respectively to the plurality of third conversion tables, and the adjusted CMYK values are obtained from the output CMYK values in the color adjusting by using the color adjustment table selected in the selecting.

Preferably, the third conversion table is for converting a color value indicating a coordinate in the device-independent color space which is not included in a color gamut of the output device to CMYK values corresponding to a color value indicating a coordinate obtained by being relatively shifted so as to be in the color gamut of the device.

Preferably, the color adjustment method further includes selecting any one among a plurality of types of printing conditions, and the first conversion table is created by applying any one among the plurality of types of printing conditions, the output CMYK values corresponding to the object indicated by the input image data are obtained from the input image data in the color converting by using the plurality of color conversion tables included in a profile set that corresponds to the printing condition selected in the selecting among a plurality of profile sets, the plurality of color conversion tables and the color adjustment table being associated with a printing condition applied to the first conversion table on which the color conversion tables and the color adjustment table are based on in each of the profile sets, and the adjusted CMYK values are obtained from the output CMYK values in the color adjusting by using the color adjustment table included in the profile set corresponding to the printing condition selected in the selecting.

Preferably, the printing conditions include a paper type.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a diagram explaining data configurations of profile sets;

FIG. 3 is a diagram describing a configuration of page data;

FIG. 7 is a schematic diagram showing a state where K: 0% color patches are arranged in the color chart of FIG. 6;

FIG. 26 is a diagram describing a wizard screen for creating a profile set;

FIG. 31 is a diagram describing a wizard screen for creating a profile set;

FIG. 32 is a diagram describing a wizard screen for creating a profile set;

DESCRIPTION OF THE PREFERRED EMBODIMENTS

Figure 1:
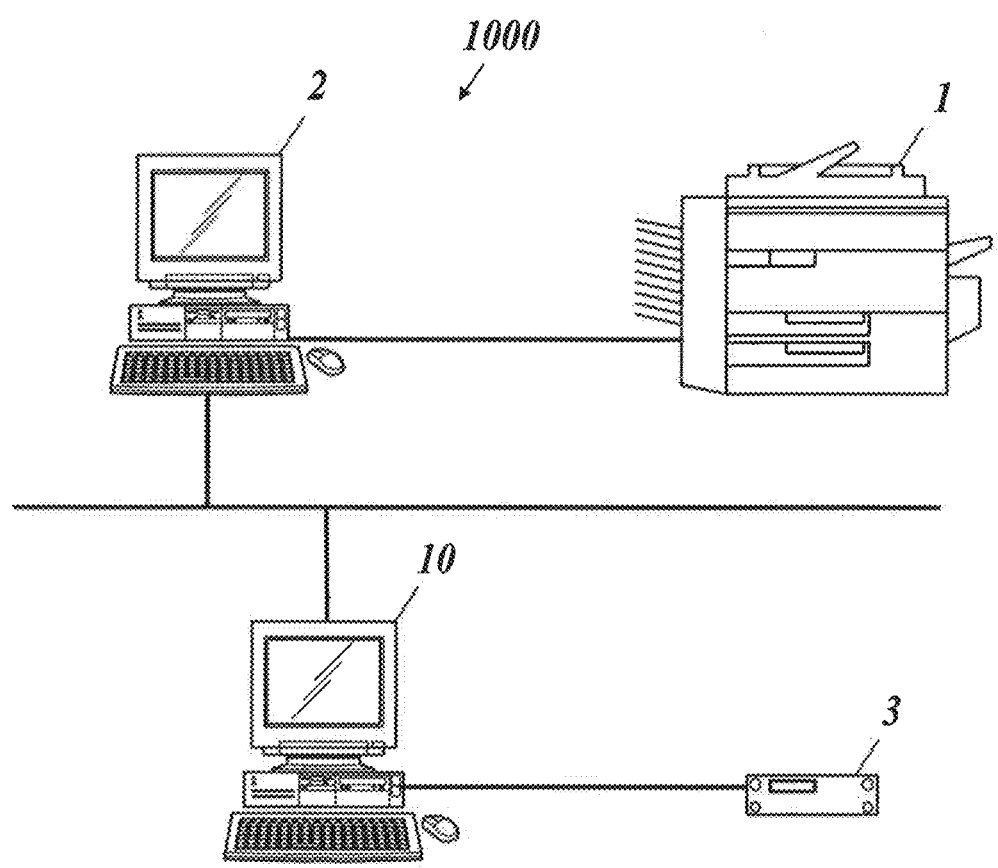
FIG. 1 is a system configuration diagram of a color adjustment system according to an embodiment.

Hereinafter, a color adjustment system according to an embodiment of the present invention will be described with reference to the drawings. However, the scope of the invention is not limited to the examples shown in the drawings. In the following descriptions, same numeral references are used for the same functions and configurations and their descriptions are omitted.

Further, in the embodiment of the present invention, the constituting apparatuses are all together called the color adjustment system. However, it is needless to say that a part of the apparatuses or the entire apparatuses that constitute the color adjustment system can be called the color adjustment apparatus.

FIG. 1 is an embodiment of a configuration of the color adjustment system 1000 according to the present invention. The color adjustment system 1000 includes a color printer 1, a controller 2, a measuring device 3 and a client PC (Personal Computer) 10, for example. The color adjustment system 1000 adjusts colors of image data which is to be output from a device which is the target for color adjustment (target device) and reproduces the colors of the image data in the color printer 1 (destination device).

The color printer 1 outputs an image of CMYK colors including the three basic colors CMY (cyan, magenta, yellow) and K (black) each having different hue from each other. The color printer 1 is connected with the controller 2 via a communication interface.

The controller 2 is a PC (Personal Computer) or the like. The controller 2 obtains a print job from other computer connected via a network. Then, the controller 2 generates image data of a raster image by performing RIP (Raster Image Processer) expansion processing on the obtained print job.

Further, the controller 2 stores a profile set which is sent from the client PC 10 in a storage device such as HDD. For example, a profile set includes source profiles which are profiles of the above mentioned target device, a printer profile which is the profile of the color printer 1, device link profiles which are created by compiling the source profiles and the printer profile and the after mentioned color adjustment tables as shown in FIG. 2. A plurality of profile sets are created according to types of color printer which performs output, types of paper such as coated paper or regular paper and the source files to be used. Profile sets are managed according to paper types because color reproducibility in image varies depending on paper type.

Source profiles are profiles in which values indicated in color space of a target device which is to be used when forming image data and values indicated in device-independent color space (for example, XYZ values expressed by XYZ color system, L*a*b* values expressed by L*a*b* color system or the like) are described by being associated to each other. In the embodiment, a profile of sRGB format in which values indicated in color space of RGB colors and XYZ values are described by being associated to each other and a profile of AdobeRGB format are used. Here, the profile of sRGB format is a device profile which complies with the International Standard Level set by the International Electrotechnical Commission (IEC). Further, the profile of AdobeRGB format is a device profile suggested by Adobe Systems Incorporated. Furthermore, in the embodiment, a profile of predetermined format (for example, "Japan Color 2001") in which values indicated in color space of CMYK colors and L*a*b* values are described by being associated to each other is used as a source file.

Printer profile is a profile obtained by performing colorimetry on a color chart which is output by the color printer 1.

Device link profiles associate the values indicated in device-dependent color space (RGB or CMYK) described in the source profiles and the CMYK values of the color printer 1 without intervention of device-independent color space. Therefore, the controller 2 can directly convert image data of RGB colors or CMYK colors output from the client PC 10 or the like to CMYK colors that are reproducible in the color printer 1.

In the embodiment, various types of device link profiles are created by using the necessary rendering intent among a plurality of rendering intents so that an appropriate color conversion can be carried out according to the object type of the image to be output.

Here, object type will be described. Object type indicates the attribution of image, and for example, includes images (photographs), graphics (graphic figures), text (letters) and the like. Further, object type includes indication of color space of the target device. For example, as shown in FIG. 3, three objects are laid out in page data P of one page. At the left upper section in the page data P, text data TX expressed with RGB colors is arranged and its object type is "RGB TEXT". In the lower right direction of the text data TX, photograph data IM expressed with RGB colors is arranged and its object type is "RGB IMAGE". In the lower left direction of the photograph data IM, a graphic GP expressed with RGB colors is arranged and its objet type is "RGB GRAPHIC".

It is preferred that the color conversion preferable for each object type is to be performed for the above images. For example, it is preferable that the image of object type "RGB IMAGE" will be printed after performing color conversion so that the color tone of the image shown in the display screen can be reproduced. Further, it is preferable that the images of object types "RGB IMAGE" and "RGB GRAPHIC" be reproduced so as to be close to the colors shown in the display screen. However, because the color gamut of display screen is wide and there is a possibility that the specified colors cannot be output due to them being outside of the color gamut of color printer, it is preferable that color conversion is performed so as to maintain their color density and saturation.

Here, color gamut is a range of colors that can be expressed or reproduced by a device which performs output processing of image data.

Further, objects to be arranged in page data P are not limited to the above mentioned objects expressed with RGB colors, and they include objects expressed with CMYK colors. That is, page data P may include an image of object type "CMYK IMAGE", an image of object type "CMYK TEXT" and an image of "CMTK GRAPHIC". In many cases, images expressed with CMYK colors are close to the colors reproducible by color printer, and in many cases their reproductively is not influenced even when the method of color conversion is not change according to the object type.

In view of the above, in recent years, a concept of rendering intent is introduced in color management. Rendering intent is a concept for including a certain characteristic when converting to the color space of printer which performs output from the device-dependent color space described in a source profile, and rendering intent includes "Perceptual", "Relative Colorimetric", "Saturation" and "Absolute Colorimetric".

"Perceptual" is to compress the entire color gamut of the target device by mapping to maintain the perceptual relation of colors so that the color gamut of target device be within the rage of color gamut of color printer when the color gamut of target device is outside of the color gamut of color printer.

"Relative Colorimetric" is to shift the colors outside the color gamut of color printer be within the range of the color gamut so that change in colors is small to maintain relative tint values, the white of each paper being set as reference, when the color gamut of target device is outside of the color gamut of color printer.

"Saturation" is to shift within the range of the color gamut of color printer by increasing change in brightness so that degradation in saturation be small so that reproduction is performed while maintaining the saturation when the color gamut of target device is outside of the color gamut of color printer.

"Absolute Colorimetric" is to perform reproduction of the absolute values of the color values and not the relative values of the color values, the white of papers being set as reference, although it also maintains the color values similarly in "Relative Colorimetric".

Here, the above described mapping method is only an example, and for example, mapping method can be arbitrarily designed according to the characteristics of the product and preferences of a user.

In the embodiment, a device link profile is created for each object type by selecting an appropriate rendering intent for the object type so that color conversion appropriate for each object will be carried out. In particular, as shown in FIG. 2, the device link profile for RGB-CMYK image is created by applying the rendering intent "Perceptual", for example. Further, the device link profile for RGB-CMYK graphic and the device link profile for RGB-CMYK text are created by applying the rendering intent "Saturation". Each of the three device link profiles which are the device link profile for CMYK-CMYK image, the device link profile for CMYK-CMYK graphic and the device link profile for CMYK-CMYK text is similarly created by applying the rendering intent "Relative Colorimetric".

Here, the rendering intent to be applied may be different from the above described rendering intent.

Although it will be described in detail later, color adjustment tables are tables to be used when color adjustment is to be performed on image data of CMYK which is converted by a device link profile in order to reduce the using amount of color materials (toner material) in the color printer 1.

The controller 2 can perform color conversion processing and color adjustment processing on image data generated by RIP expansion processing by using device link profiles and color adjustment tables included in the profile set. The controller 2 sends the image data to which color conversion processing and color adjustment processing are performed to the color printer 1 to be output.

The measuring device 3 measures a color chart output by the color printer 1. In particular, the measuring device 3 spectroscopically measures the color of each color patch included in the color chart. The measuring device 3 sends the measurement values of the measured colors to the client PC 10. Here, the measurement values obtained by the measuring device 3 are expressed by spectral reflection factor values, values of device-independent color system such as XYZ and L*a*b* set by the Commission Internationale de L'Eclairage (CIE) or the like.

The measuring device 3 is connected with the client PC 10 via the communication interface.

Here, when the measurement values obtained by the measuring device 3 are expressed with spectral reflection factor values or XYZ values, the client PC 10 may convert the measurement values to L*a*b* values or values of CIECAM02.

In the embodiment, a case where L*a*b* values are used as the measurement values obtained by the measuring device 3 will be described.

Figure 4:
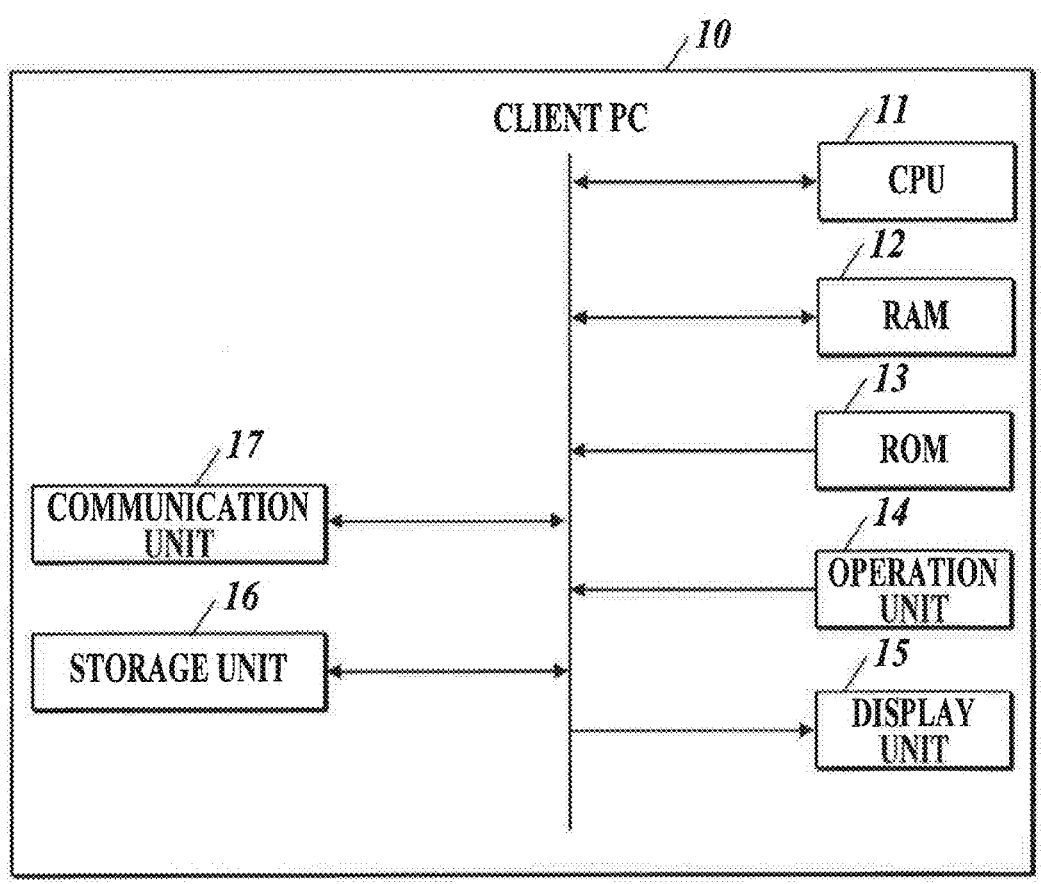
FIG. 4 is a block diagram showing a functional configuration of a client PC.

As shown in FIG. 4, the client PC 10 includes a CPU (Central Processing Unit) 11, a RAM (Random Access Memory) 12, a ROM (Read Only Memory) 13, an operation unit 14, a display unit 15, a storage unit 16 and a communication unit 17, for example.

The CPU 11 executes various types of programs (program codes) which are stored in the ROM 13 according to an input signal input from each of the parts of the client PC 10. Further, the CPU 11 outputs an output signal to each of the parts on the basis of the programs which are executed and integrally controls the overall operation of the client PC 10.

For example, the CPU 11 creates the above described printer profile, device link profiles and color adjustment tables. The CPU 11 creates a profile set by associating the created printer profile, device link profiles and color adjustment tables with the used source profiles.

The RAM 12 forms a work area for temporarily storing various types of programs which are to be executed by the CPU 11 and data of the programs.

The ROM 13 consists of a non-volatile semiconductor memory and the like. The ROM 13 is a medium for storing various types of programs which are to be executed by the CPU 11 in a form of program codes that can be read by the CPU 11. Moreover, parameters, files and the like which are needed for the CPU 11 to execute of the programs are stored in the ROM 13.

The operation unit 14 includes a key board including a cursor key, letter input keys and various types of functional keys and a pointing device such as a mouse. When the operation unit 14 receives an operation input by a user, the operation unit 14 outputs an operation signal according to the operation content to the CPU 11.

The display unit 15 consists of LCD (Liquid Crystal Display) and the like. The display unit 15 displays various types of operation screens and various types of processing results in compliance with instructions from the CPU 11.

The storage unit 16 is a storage device such as HDD (Hard Disk Drive) or the like. The storage unit 16 stores the profile sets created by the CPU 11.

The communication unit 17 is a communication interface which connects the client PC 10 with the controller 2 and the measuring device 3. The communication unit 17 performs sending and receiving of data with the controller 2 and the measuring device 3.

For example, the communication unit 17 receives measurement values of color chart which are sent from the measuring device 3. Further, the communication unit 17 sends the profile sets and the like stored in the storage unit 16 to the controller 2.

Next, creating procedure of the printer profile of the color printer 1 performed by the client PC 10 will be described. Here, the printer profile of the color printer 1 includes two conversion tables which are the first LUT (Look Up Table) 100 and the second LUT 200. The first LUT 100 is a conversion table used when the printer profile is selected as the input side when performing color conversion and the second LUT 200 is a conversion table used when the printer profile is selected as the output side when performing color conversion.

Figure 5:
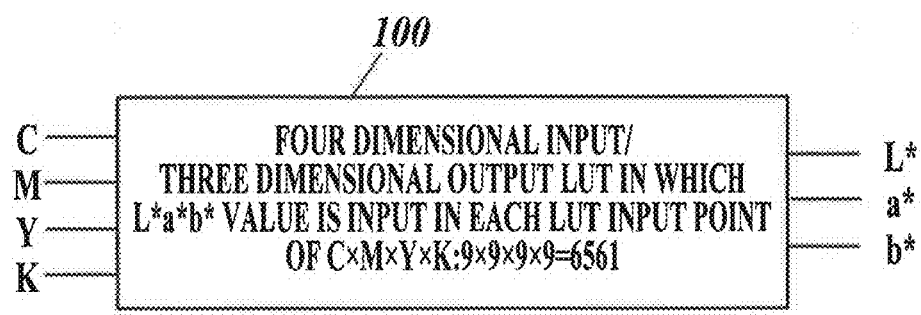
FIG. 5 is an explanatory diagram of the first LUT.

The first LUT 100 is a conversion table for converting the combinations of CMYK values into L*a*b* values of color system. As shown in FIG. 5, the first LUT 100 is a four dimensional input/three dimensional output LUT where L*a*b* values are input to LUT input points (lattice points) which are combinations of CMYK values of C×M×Y×K: 9×9×9×9=6561 points, for example. Here, the values of nine patterns of each of CMY are C, M, Y: 0%, 10%, 20%, 30%, 40%, 55%, 70%, 85%, and 100%. Further, values of nine patters of K are, K: 0%, 10%, 20%, 30%, 40%, 50%, 60%, 80% and 100%.

Hereinafter, creating procedure of the first LUT 100 will be described.

Figure 6:
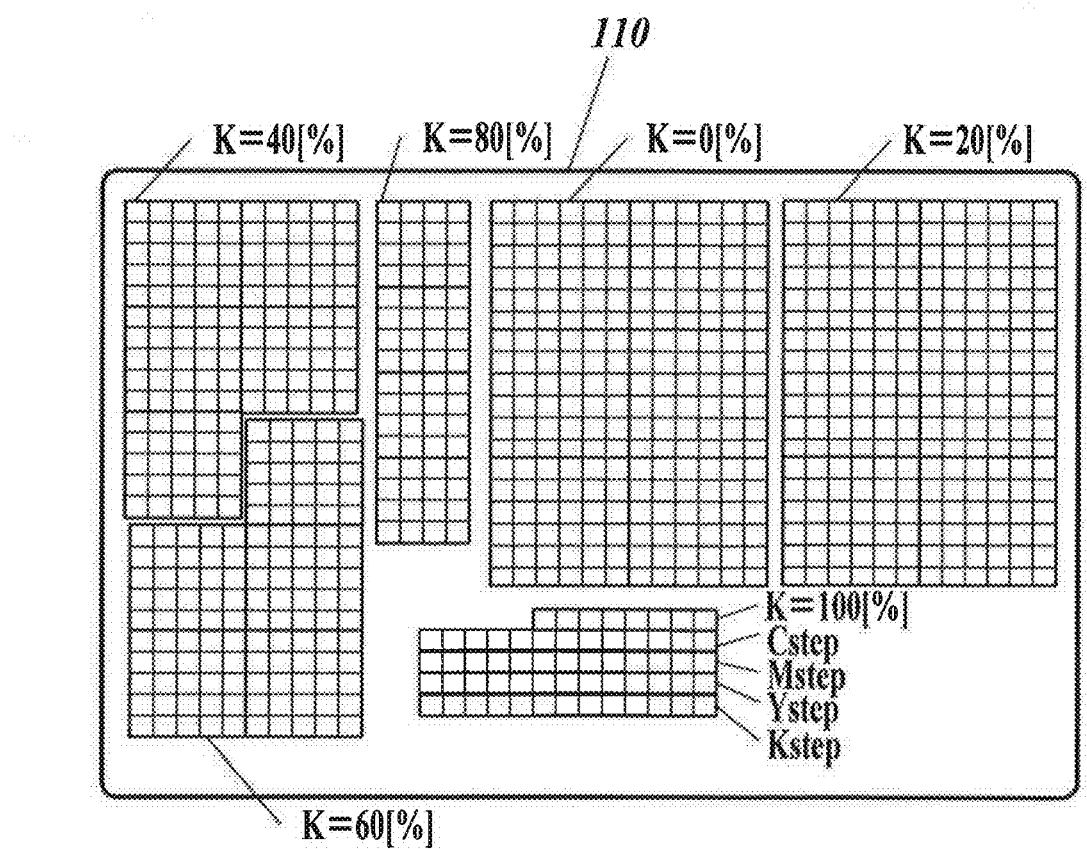
FIG. 6 is a schematic diagram showing a color chart.

First, the CPU 11 of the client PC 10 outputs the color chart 110 shown in FIG. 6 without performing color conversion thereof via the controller 2. Here, the image data for outputting the color chart 110 is stored in the storage unit 16 or the like in advance. As for the color chart 110, a general color chart in compliance with ISO12642 standard is used, for example. Here, an arbitrary color chart can also be used. In the color chart 110, the maximum value 100% of each CMYK is divided in a plurality of numbers and color patches according to the combinations of divided values of CMYK are included. Here, even when the color chart 110 is output without performing color conversion thereof, processing for limiting the total value of CMYK (maximum of 400%) to be maximum of 300%, for example, for calibration correction processing to correct output variation in the color printer 1 and for improving the fixation or improving output stability in high density parts can be performed in the color printer 1. The processing for limiting the total value of CMYK may be performed before sending the color chart to the color printer 1 after the above correction is performed in the processing by the controller 2 and not in the color printer 1. Such processing may be performed in a regular output processing other than in the outputting of color chart 110.

In particular, as shown in FIG. 6, the color chart 110 includes 6 patterns which are (1) K: 0%, (2) K: 20%, (3) K: 40%, (4) K: 60%, (5) K: 80% and (6) K: 100%. In the color chart 110, color patches of a plurality of points of combinations of CMY values are arranged in each of (1) to (6). For example, in (1) where K: 0%, color patches of C×M×Y: 6×6×6 points are arranged as shown in FIG. 7. Here, values of six patterns of each of CMY are C, M, Y: 0%, 10%, 20%, 40%, 70% and 100%. Similarly, in the color chart 110, color patches of C×M×Y: 6×6×6 points (C, M, Y: 0%, 10%, 20%, 40%, 70%, 100) are arranged in (2) were K: 20%, color patches of C×M×Y: 5×5×5 points (C, M, Y: 0%, 20%, 40%, 70%, 100%) are arranged in (3) where K: 40%, color patches of C×M×Y: 5×5×5 points (C, M, Y: 0%, 20%, 40%, 70%, 100) are arranged in (4) where K: 60%, color patches of C×M×Y: 4×4×4 points (C, M, Y: 0%, 40%, 70%, 100%) are arranged in (5) where K: 80% and color patches of C×M×Y: 2×2×2 points (C, M, Y: 0%, 100%) are arranged in (6) where K: 100%. Further, the color chart 110 includes (7) 13 tone steps of single color of each of CMYK (3%, 7%, 10%, 15%, 20%, 25%, 30%, 40%, 50%, 60%, 70%, 80%, 90%).

That is, the color chart 100 includes 806 points of color patches which are C×M×Y×K: 745 points+52 points of single colors in total of (1) to (7).

Next, a user measures each color patch in the output color chart 110 by the measuring device 3 in an order. Then, the CPU 11 can obtain L*a*b* values (measurement values) corresponding respectively to the combinations of CMYK values which are C×M×Y×K: 754 points and 52 points of simple colors of CMYK by the measuring device 3.

Next, with respect to points other than the above 806 points, the CPU 11 calculates L*a*b* values corresponding respectively to combinations of CMYK values which are C×M×Y×K: 9×9×9×9=6531 points.

In particular, the CPU 11 performs interpolation processing on points which do not have measurement values among C×M×Y: 9×9×9 points (C, M, Y: 30%, 55%, 85%) by using values of single color tone steps of CMY in (7) by setting C×M×Y: 6×6×6 points in (1) as sample points and calculates L*a*b* values for the points without measurement values. Next, the CPU 11 performs similar interpolation processing on each of C×M×Y: 6×6×6 points in (2) C×M×Y: 5×5×5 points in (3), C×M×Y: 5×5×5 points in (4), C×M×Y: 4×4×4 points in (5) and C×M×Y: 2×2×2 points in (6) and calculates L*a*b* values for the points without measurement values. That is, by performing such interpolation processing by setting C×M×Y×K: 754 points as sample points, the CPU 11 can interpolate C×M×Y×K: 9×9×9×6 points.

Further, with respect to the three points which do not have measurement values among K: 9 points (K: 10%, 30%, 50%), the CPU 11 performs interpolation processing as described below. That is, with respect to C×M×Y: 9×9×9 points of K: 10%, interpolation processing is performed by using the L*a*b* values of C×M×Y: 9×9×9 points of K: 0%, the L*a*b* values of C×M×Y: 9×9×9 points of K: 20% and the values of simple color tone steps of K which are already obtained to calculate the L*a*b* value of each of the points. Further, with respect to C×M×Y: 9×9×9 points of K: 30%, interpolation processing is performed by using the L*a*b* values of C×M×Y: 9×9×9 points of K: 20%, the L*a*b* values of C×M×Y: 9×9×9 points of K: 40% and the values of simple color tone steps of K which are already obtained to calculate the L*a*b* value of each of the points. Furthermore, with respect to C×M×Y: 9×9×9 points of K: 50%, interpolation processing is performed by using the L*a*b* values of C×M×Y: 9×9×9 points of K: 40%, the L*a*b* values of C×M×Y: 9×9×9 points of K: 60% and the values of simple color tone steps of K which are already obtained to calculate the L*a*b* value of each of the points.

By the above, the CPU 11 can obtain the L*a*b* values of LUT input points which are C×M×Y×K: 9×9×9×9=6561 points of the first LUT 100.

Detail of the above described interpolation processing is described in JP 2003-78773, for example. The interpolation processing where C×M×Y: 5×5×5 points in (4) are set as sample points will be described briefly as an example.

The CPU 11 calculates the L*a*b* values of the points which are subjected to interpolation processing (point without measurement values) by the L*a*b* values of the sample points and the tone step values of simple colors of CMY. Here, L*a*b* of the points which are subjected to interpolation processing are indicated as Lm*am*bm and L*a*b* of the sample points are indicated as Li*ai*bi* (i=1 to 4).

Figure 8:
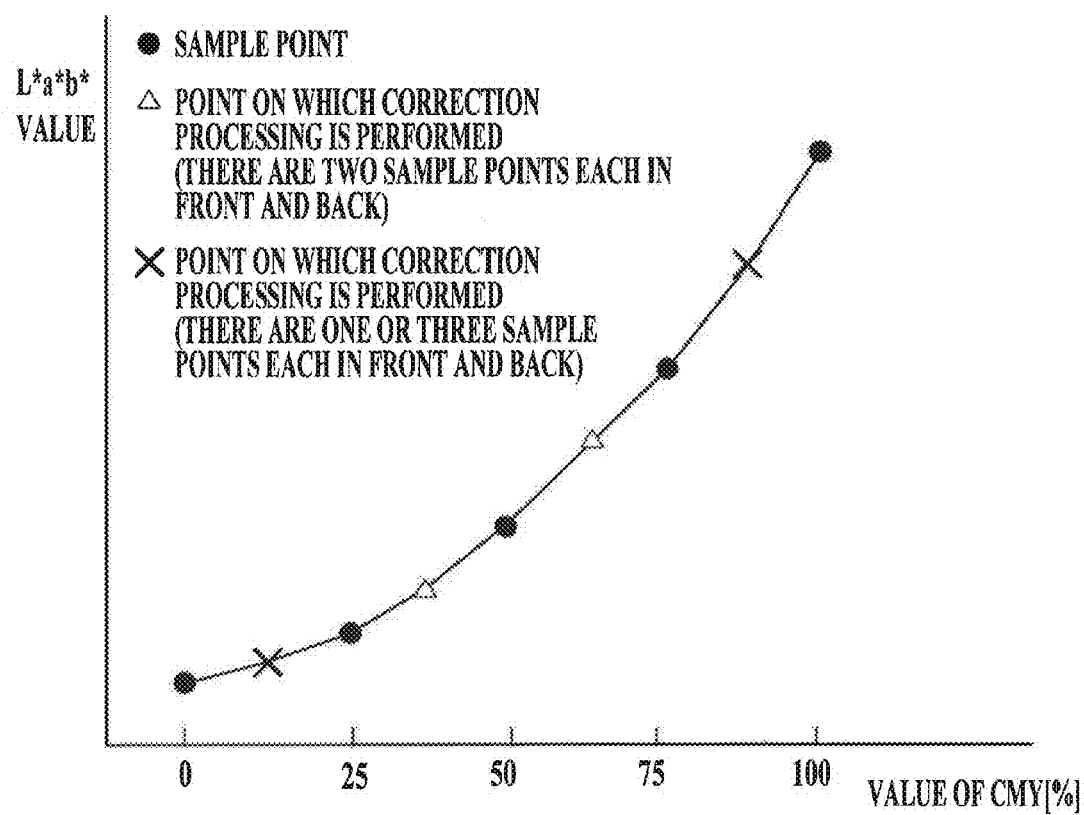
FIG. 8 is a diagram showing a distribution of sample points and points where interpolation processing is to be performed on a trajectory according to CMYK values and color system values.

In FIG. 8, ● indicates sample points and Δ and X indicate points which are subjected to interpolation processing. The CPU 11 calculates Lm*am*bm* values by using different interpolation formula in a case where there are two sample points each in front and back as in Δs and in a case where there are 1 or three samples points each in front and back as in x s.

In particular, the interpolation formula for the former (Δ points) can be obtained by the following formulas (1) to (3)

$$Lm^* = -(1/16)L1^* + (9/16)L2^* + (9/16)L3^* - (1/16)L4^* \quad (1)$$

$$am^* = -(1/16)a1^* + (9/16)a2^* + (9/16)a3^* - (1/16)a4^* \quad (2)$$

$$bm^* = -(1/16)b1^* + (9/16)b2^* + (9/16)b3^* - (1/16)b4^* \quad (3)$$

On the other hand, the interpolation formula for the latter (x points) can be obtained by the following formulas (4) to (6).

$$Lm^* = (5/16)L1^* + (15/16)L2^* - (5/16)L3^* + (1/16)L4^* \quad (4)$$

$$am^* = (5/16)a1^* + (15/16)a2^* - (5/16)a3^* + (1/16)a4^* \quad (5)$$

$$bm^* = (5/16)b1^* + (15/16)b2^* - (5/16)b3^* + (1/16)b4^* \quad (6)$$

Figure 9:
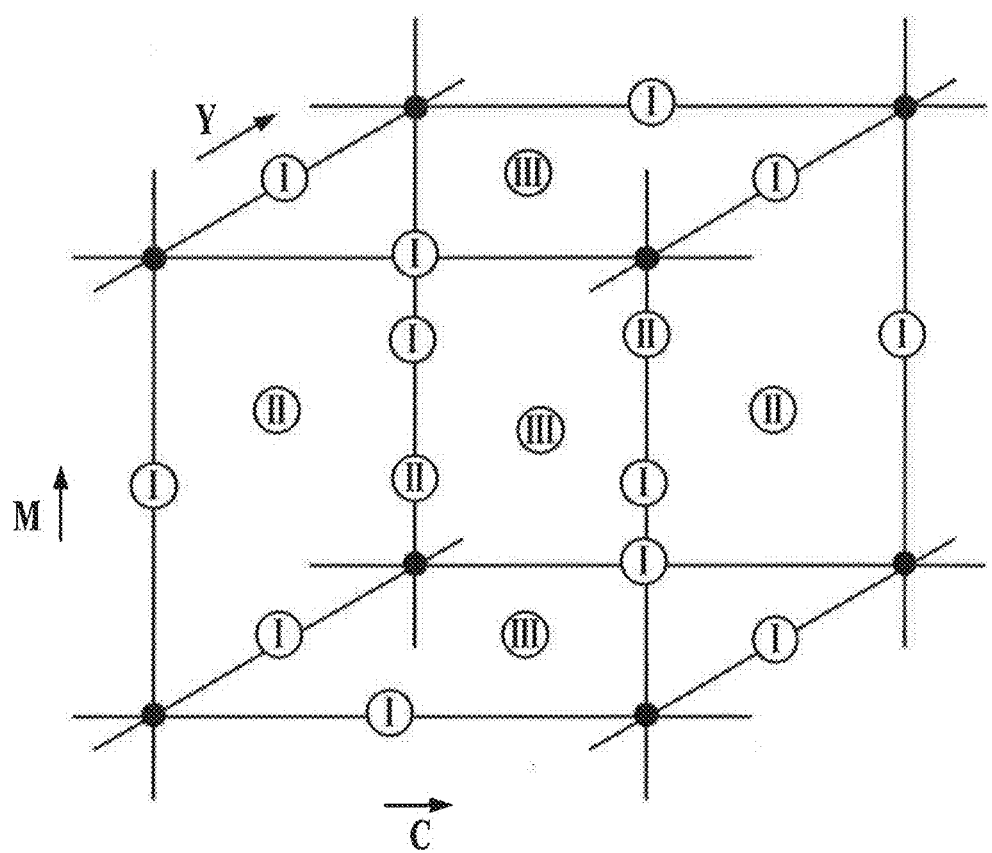
FIG. 9 is a diagram showing an order for interpolation processing regarding combinations of CMY values.

Next, with respect to the points which are subjected to interpolation processing included in C×M×Y: 9×9×9 points, the CPU 11 repeatedly performs the interpolation processing following the procedure of I to III shown in FIG. 9 by using the above mentioned interpolation formulas. As a result, when the interpolation processing is completed, the CPU 11 can interpolate the C×M×Y: 9×9×9 points with the sample points of C×M×Y: 5×5×5 points in (4).

In the above described way, the CPU 11 can create the first LUT 100. However, as described earlier, in the first LUT 100, the CPU 11 sets each value of CMY to be C, M, Y: 0%, 10%, 20%, 30%, 40%, 55%, 70%, 85% and 100% and sets the value of K to be 0%, 10%, 20%, 30%, 40%, 50%, 60%, 80% and 100%. That is, nine patterns of each of the CMYK values are not values where the maximum value 100% is equally divided in eight.

Figure 10:
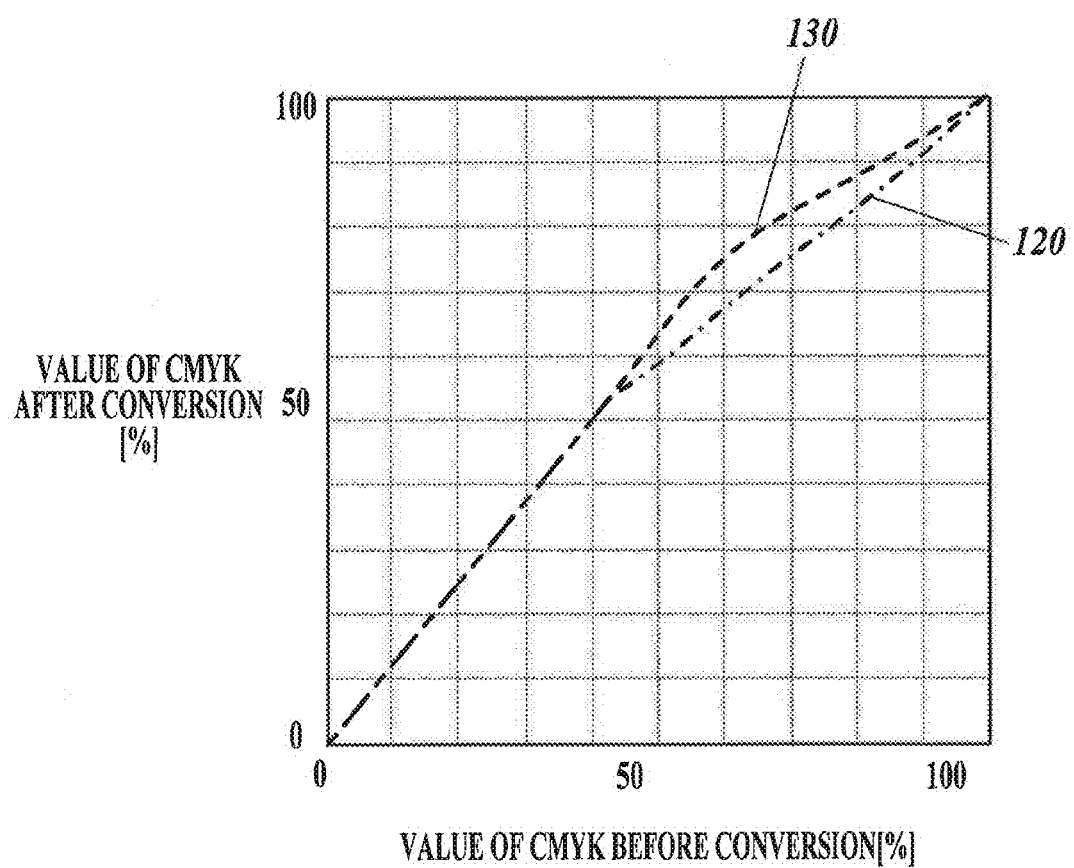
FIG. 10 is a diagram showing a one dimensional LUT by which each value of CMYK is converted.

Therefore, by the first dimensional LUTs 120 and 130 shown in FIG. 10, the CPU 11 converts each value of CMYK into a value where 100% is equally device in eight. Then, the CPU 11 performs processing to input each value of CMYK which are converted to the first LUT 100. In particular, the CPU 11 converts C, M, Y: 10% to 12.5%, C, M, Y: 20% to 25%, C, M, Y: 30% to 37.5%, C, M, Y: 40% to 50%, C, M, Y: 55% to 62.5%, C, M, Y: 70% to 75% and C, M, Y: 85% to 87.5% by using the one dimensional LUT 120. Further, the CPU 11 converts K: 10% to 12.5%, K: 20% to 25%, K: 30% to 37.5%, K: 40% to 50%, K: 50% to 62.5%, K: 60% to 75% and K: 80% to 87.5% by using the one dimensional LUT 130.

Figure 11:
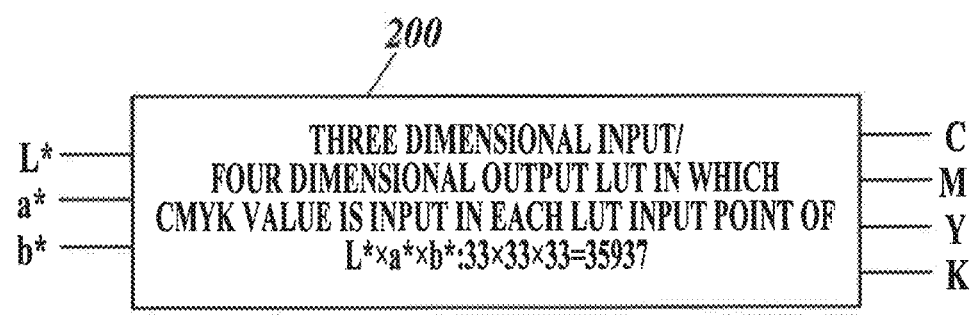
FIG. 11 is an explanatory diagram of the second LUT.

The second LUT 200 converts L*a*b* values to combinations of CMYK values. As shown in FIG. 11, the second LUT 200 is a three dimensional input/four dimensional output LUT where CMYK values are input to LUT input points of L*a*b* values of L*×a*×b*: 33×33×33=35937 points.

In the embodiment, the second LUTs 200 where "Perceptual", "Relative Colorimetric" and "Saturation" among the above described plurality of types of rendering intents are respectively applied are created.

Hereinafter, creating procedure of the second LUTs 200 will be described. In the following description, the procedure for creating the second LUT 200 in which the rendering intent "Relative Colorimetric" is applied will be described. However, creating procedures of the second LUT in which the rendering intent "Perceptual" is applied and the second LUT in which the rendering intern "Saturation" is applied are similar to the creating procedure of the second LUT 200 in which the rendering intent "Relative Colorimetric" is applied. Therefore, the overlapping procedures will be omitted. Further, in the following description, two colors of C and M are set as the basic colors for easy understanding. Here, it is assumed that each of C, M, Y and K takes a value of 0 to 100%.

First, the CPU 11 converts four dimensional data which is L*a*b* values of C×M×Y×K: 9×9×9×9 in the first LUT 100 which is created as described above to three dimensional data which is L*a*b* values of C×M×Y: 9×9×9. Therefore, for example, the method described in the specification of JP Patent No. 2898030 can be used.

For example, first, each value of CMY is equally divided in eight and LUT-A which is LUT input points of C×M×Y: 9×9×9 is created. Here, the number of LUT input points in LUT-A can be set arbitrarily. Next, in every LUT input point in LUT-A, CMYK value in which K value for emphasizing gray component is added is input. The K value for emphasizing gray component is calculated by using the K curve 0 shown in FIG. 19 on the basis of the minimum values of CMY indicated in the LUT input point. That is, the K curve 0 ($K_0$) can be expressed by the following formula (7). Here, when the minimum values of CMY are indicated as min [C, M, Y], $$K_0 = 2.0(\min[C,M,Y] - 50(\%)) \quad (7)$$

However, $K_0 = 0(\%)$ when $K_0 < 0$.

Figure 19:
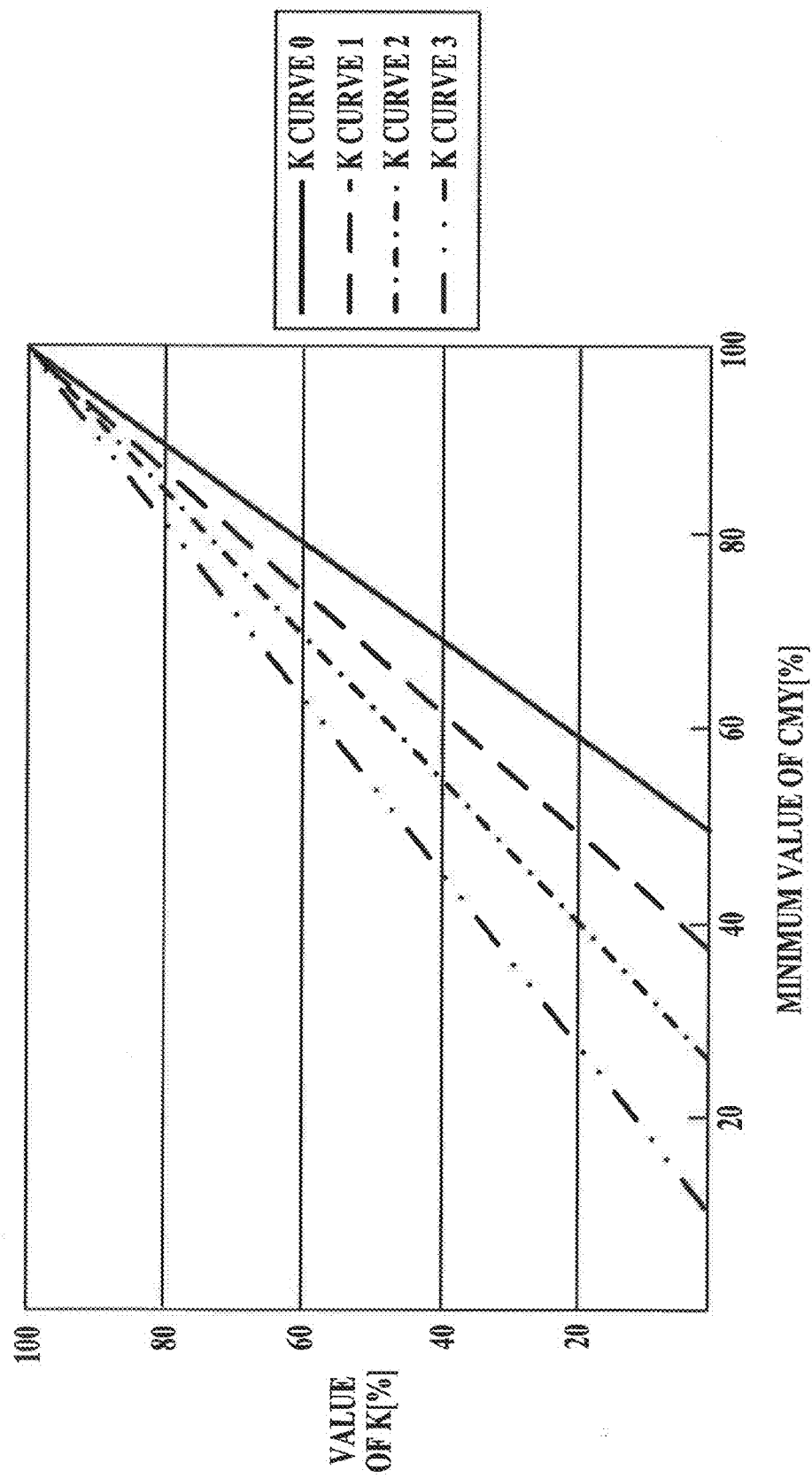
FIG. 19 is a diagram describing K version generation curve.
Figure 20:
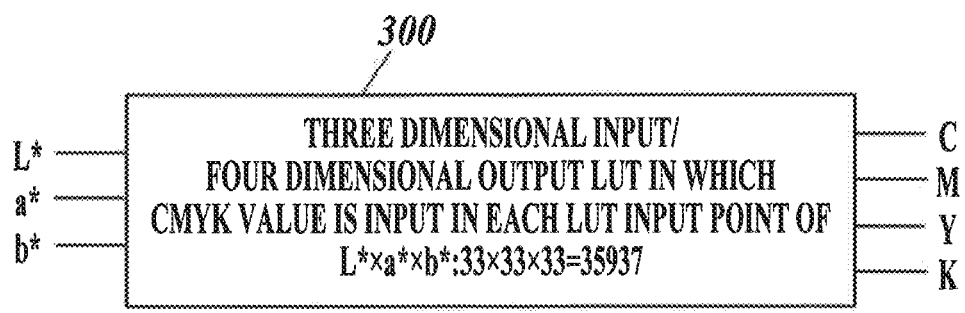
FIG. 20 is an explanatory diagram of the third LUT.

Here, FIG. 19 exemplifies K curve 0 where it is a straight line as a whole. However, K curve 0 may be a line where near its starting point is curved or may be a line which is curved as a whole.

The K value which is obtained as described above is input in each LUT input point along with each value of CMY. For example, CMYK values which are to be input in the LUT input point (C: 62.5%, M: 75%, Y: 87.5%) will be described. First, K value is calculated as (K: 25%) because the minimum value of CMY is 62.5%. As a result, the CMYK values to be input in the LUT input point will be (C: 62.5%, M: 75%, Y: 87.5%. K: 25%) by the K value being added to the above each value of CMY. As for the other LUT input points, CMYK values are obtained in similar way and are input.

Here, the K curve used to obtain the K value is not limited to what is described above. Further, as described later, CMYK values to be input to the LUT input points can be set so that the total amount of color materials of CMYK will be decreased. Here, in the embodiment, information on the K curve which is used and information indicating the limitation amount of color materials are stored along with the second LUTs 200, for example. Such information is stored to make the ratio of K value with respect to CMYK values be larger than those obtained as described above when CMYK values are to be obtained when the after-mentioned color adjustment tables are to be created. That is, to allow the K curve to be used and/or the decreasing amount in the total amount of color material in the creating of color adjustment tables be those which make the ratio of K value with respect to the CMYK values be larger than that of when the second LUT 200 was created. In the embodiment, the K curve to be used when creating the second LUT 200 is set to K curve 0 and the limitation amount of color materials thereof is set to 400%.

Next, similarly, each value of CMY is equally divided in eight and LUT-B which is LUT input points of C×M×Y: 9×9×9 is created. LUT input points in the LUT-B correspond to the LUT input points in the LUT-A, respectively. Then, L*a*b* values that respectively correspond to the CMYK values input in the LUT input points in the LUT-A are obtained by performing interpolation using the first LUT 100, and they are input in their respective LUT input points in the LUT-B.

As described above, by obtaining CMYK values and L*a*b* values of C×M×Y: 9×9×9=729 points, the three dimensional data of C×M×Y: 9×9×9 can be created from the four dimensional data of C×M×Y×K: 9×9×9×9.

Next, the CPU 11 develops the combinations of CMYK values with respect to the LUT input points of L*×a*×b*: 33×33×33 points by using the LUT-A and the LUT-B which are created as described above.

First, procedure for developing the combinations of CMTK values with respect to points which have measurement values of L*a*b* (that is, points inside the color gamut of the color printer 1) among the combinations of L*×a*×b*: 33×33×33 points will be described. In such case, the convergent calculation processing described below is performed after the L*a*b* values are shifted in a predetermined direction according to the applied rendering intent as needed.

The convergent calculation processing used in the development is described in JP 2003-78773 in detail, for example. Here, the development procedure will be described briefly.

Figure 12:
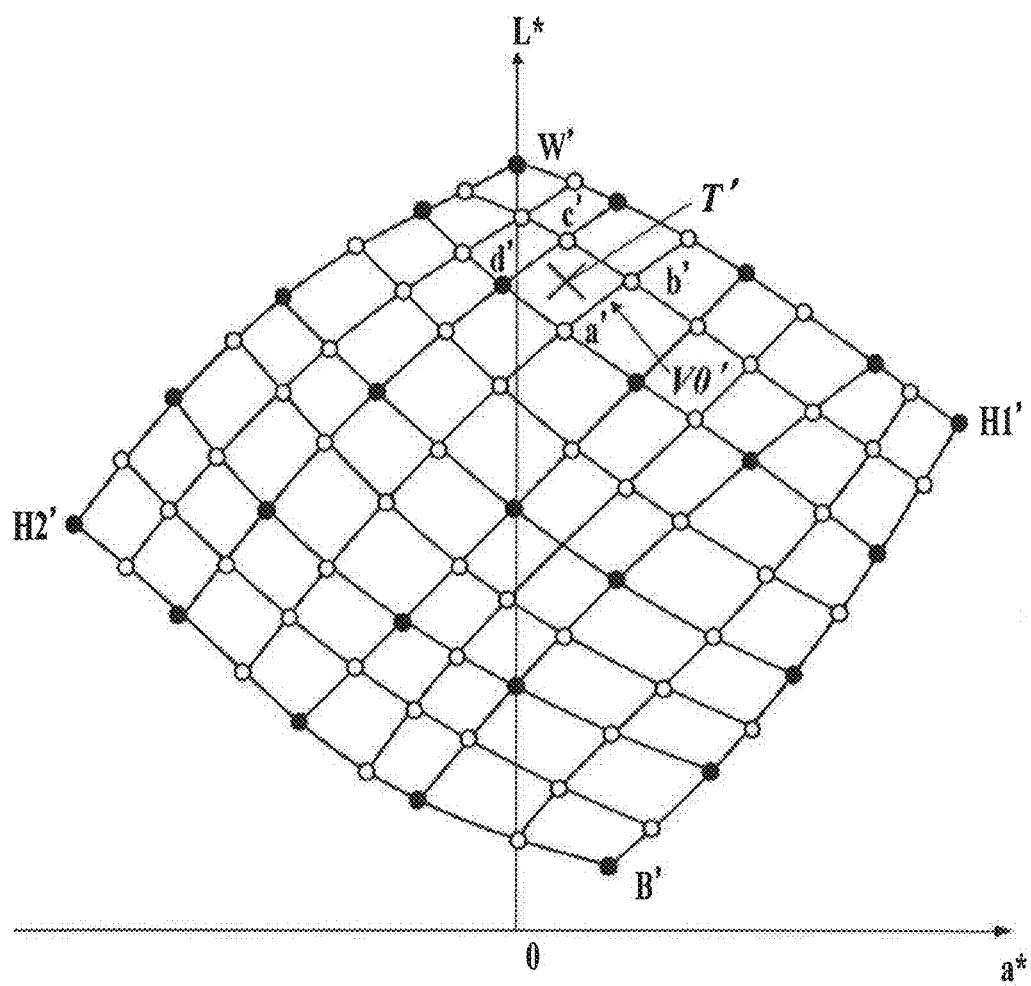
FIG. 12 is a diagram showing a target value T' in a*L* coordination system.

FIG. 12 is a coordination system in which brightness L* is plotted in the vertical axis and a* is plotted in the horizontal axis with respect to the combinations of C×M: 9×9 points (Y: 0%) constitute of two dimensional CM values within three dimensional CMY values. In FIG. 12, H1' and H2' indicate apex points of saturation, W' indicates the apex point of white and B' indicates the apex point of blue. Here, although the CPU 11 performs development processing of three dimensional CMY values in reality, development processing of two dimensional CM values will be described for easy understanding.

In FIG. 12, the target value T' is the L*a*b* value of the target point where the combination of CMY values is to be obtained among L*×a*×b*: 33×33×33 points. The case where the target value T' exists in the region V0' encircled by lattice points a' to d' in FIG. 12 is assumed. In this case, the CPU 11 estimates that the target value T which is a combination of CM values in the CM coordination system is within the region V0 encircles by the lattice points a to d shown in FIG. 13. Here, in FIG. 13, H1 and H2 are points corresponding to the apex points of saturation H1' and H2', W is a point corresponding to the apex point of white W' and B is a point corresponding to the apex point of blue B'.

Figure 13:
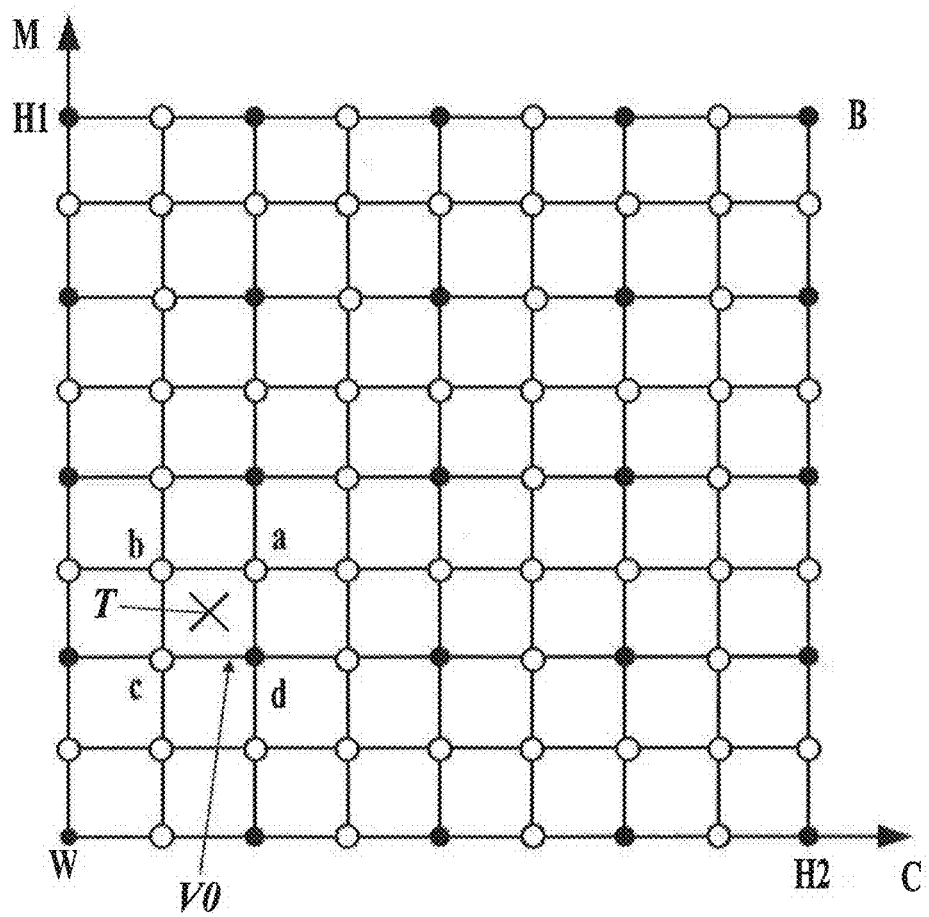
FIG. 13 is a diagram showing a target value T in CM coordination system.
Figure 14:
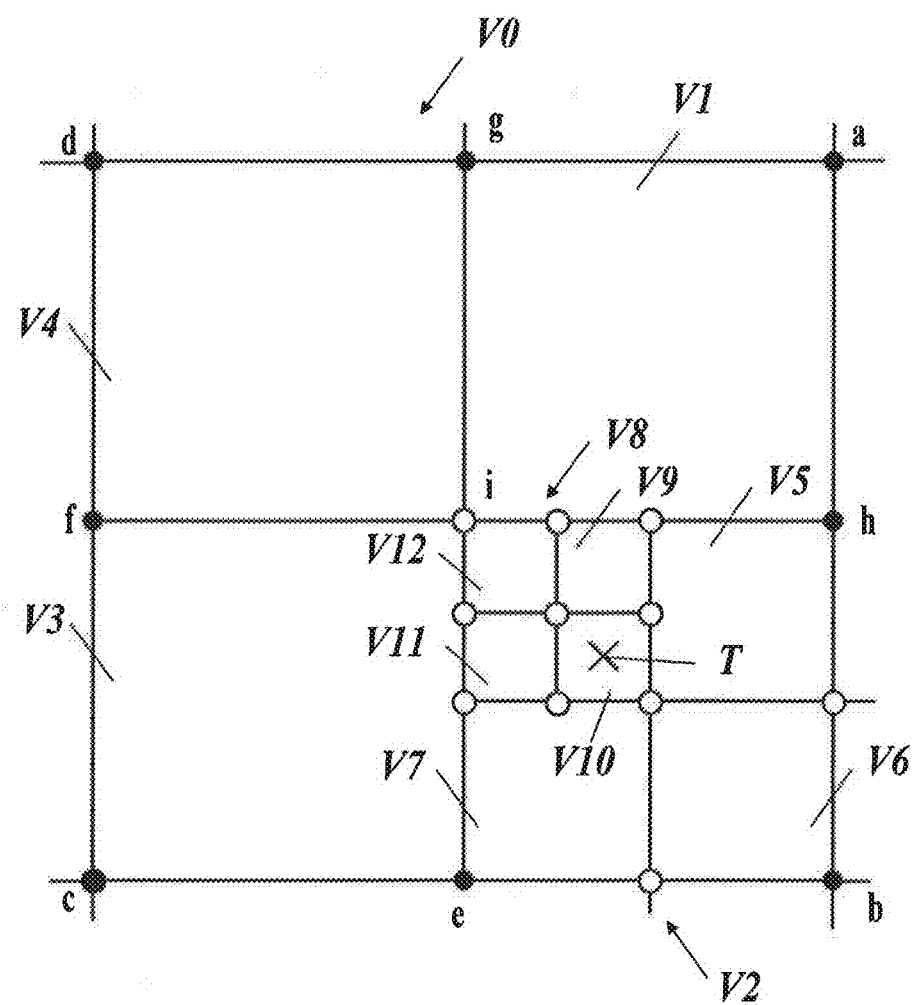
FIG. 14 is an enlarged diagram of the region V0 shown in FIG. 13.
Figure 15:
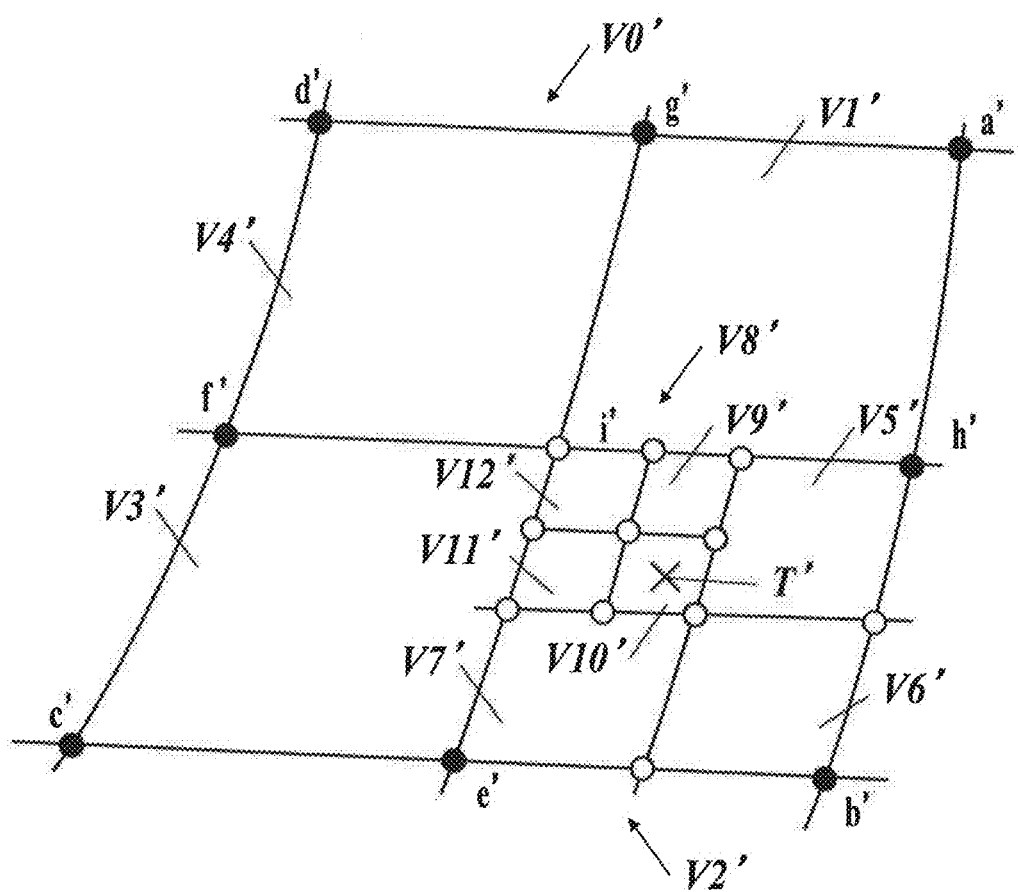
FIG. 15 is a diagram showing the region V0' in a*L coordination system corresponding to the region V0 showing in FIG. 14.

Next, the CPU 11 equally divides the region V0 which is encircled by the lattice points a to d shown in FIG. 13 in four which are regions V1 to V4 by the dividing points e to i shown in FIG. 14. Here, the CPU 11 calculates values of the dividing points e to i by weighting average using the surrounding lattice points where values thereof are already obtained. Then, the CPU 11 plots the L*a*b* values corresponding to the dividing points e to i on the coordination system shown in FIG. 15. The dividing points e' to i' shown in FIG. 15 are plotting points corresponding to the dividing points e to i shown in FIG. 14.

Further, the CPU 11 determines in which region among the four regions V1' to V4' formed by the dividing points e' to i' the target value T' exits. For example, when the target value T' is in the region V2 as shown in FIG. 15, the CPU 11 estimates that the target value T is in the region V2 shown in FIG. 14 corresponding to the region V2'.

Next, the CPU 11 divides the estimated region V2 into regions V5 to V8, and estimates in which region among the divided regions V5 to V8 the target value T exists. Hereinafter, the CPU 11 similarly repeats the dividing/estimating of a region and gradually decreases the size of the regions and converges the regions, such as the region V0 to regions V1 to V4 to regions V5 to V8 to regions V9 to V12 . . . . Then, the CPU 11 can obtain the target value T (combination of CM values) by the four lattice points which forms the converged region or by the average value of the dividing points. However, the actual CPU 11 calculates the target value T (combination of CMY values) of each target point with respect to the three dimensional CMY values one point by one point. That is, CMY values are calculated by performing back calculation from the LUT-B which is generated as described above. Because the LUT-B corresponds to the LUT-A which is generated as described above, combinations of CMYK values can be interpolated and obtained from the calculated CMY values. Here, the CPU 11 performs the above convergent calculation processing because although the conversion from the coordination system of FIG. 13 to the coordination system of FIG. 12 is known, conversion of the other way around is very complicated and a good conversion formula is not yet known.

Here, the method using the above convergent calculation is described in the embodiment. However, the interpolation method described in the specification of JP Patent No. 2895086 may also be used, for example.

Next, procedure for developing combinations of CMYK values will be described for a case where L*a*b* values are output of the color gamut among L*×a*×b*: 33×33×33 points. In this case, the CPU 11 executes processing of color gamut mapping. That is, the CPU 11 maps the L*a*b* values at values inside the color gamut by the method according to the applied rendering intent and thereafter develops combinations of CMYK values by the above described convergent calculation processing. Hereinafter, the color gamut mapping will be described. Here, in the following description, the case where color gamut mapping is carried out by applying the rendering intent "Relative Colorimetric" will be described as an example.

Figure 16:
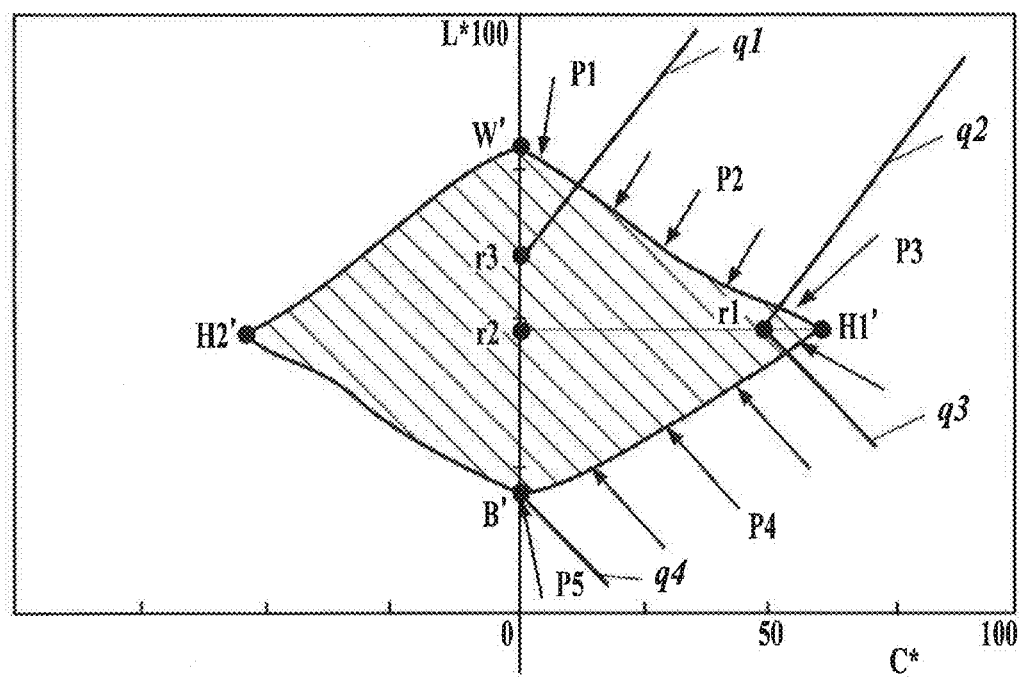
FIG. 16 is a diagram describing color gamut mapping.

FIG. 16 is a sectional view where L*a*b* color system color space is cut in a direction including the L* axis at a certain hue. Here, in FIG. 16, B' indicates the apex point of black (black apex point). Further, in FIG. 16, the shaded part having four apex points which are the apex point of saturation H1', the apex point of white W', the apex point of saturation H'2 and the apex point of black B' is the color gamut of the color printer 1.

First, the CPU 11 calculates the hue angle h and the saturation C* by using the values a* and b*. The hue angle h can be calculated by the following formula (8) and the saturation C* can be calculated by the following formula (9).

$$h = \arctan(b^*/a^*)/\pi \times 180 \quad (8)$$

$$C^* = ((a^{*}{}^2)+(b^{*}{}^2))^{0.5} \quad (9)$$

Next, with respect to the color gamut of the color printer 1 at the hue angle h, the CPU 11 obtains brightness L* and saturation C* of the apex point of saturation H1', the apex point of white W' and the apex point of black B'. For example, the brightness L* and saturation C* of the apex point of saturation H1' are calculated as follows, for example. The CPU 11 connects the point that fulfills M: 100% and C, Y: 0%, the point that fulfills M, Y: 100% and C: 0%, the point that fulfills Y: 100% and M, C: 0%, the point that fulfills C, Y: 100% and M: 0%, the point that fulfills C: 100% and M, Y: 0% and the point that fulfills C, M: 100% and Y: 0%. Then, the CPU 11 obtains the L*a*b* values corresponding to the CMY values of the connected points. Further, the CPU 11 calculates the hue angle h and saturation C* by the obtained L*a*b* value of each point. Furthermore, by the CPU 11 performing interpolation calculation by using the calculated hue angle h and saturation C* of each point, the brightness L* and saturation C* of the apex point of saturation H1' are calculated.

Next, the CPU 11 sets the hue angle h to be constant and determines whether a certain point (input point) which is outside of the color gamut is included in any of the regions P1 to P5 shown in FIG. 16. Then, the CPU 11 maps the input point in the color gamut on the basis of the mapping procedure defined for each of the regions P1 to P5 and the target point on the color gamut that corresponds to the target value T' is decided.

Here, in the embodiment, the target point r1 of high saturation color is set at a position where saturation C* is smaller than the apex point of saturation H1'. That is, the CPU 11 arranges the target point r1 on the line that connects between the intermediate point r2 and the apex point of saturation H1' in the apex point of saturation H1' side as shown in FIG. 16. Further, the CPU 11 arranges the target point r3 of a color close to the apex point of white W'. The CPU 11 sets the target point r3 to be at a position on the line that connects between the apex point of white W' and the intermediate point r2. Here, the intermediate point r2 is a point which takes the intermediate value of the brightness L* of the apex point of white W' and the brightness L* of the apex point of black B'.

First, the CPU 11 sets the border of each of the regions P1 to P5 shown in FIG. 16.

In particular, the CPU 11 decides the inclinations of the region P2 and the region P4 on the basis of the method defined in advance. Here, the region P2 is a region positioned in the upper side of the color gamut and to be mapped in the color gamut by having the inclination decided by the CPU 11. Further, the region P4 is a region positioned in the lower side of the color gamut and to be mapped in the color gamut by having the inclination decided by the CPU 11.

Further, the CPU 11 forms the border lines q1 to q4 on the basis of the inclinations of the region P2 and the region p4. The CPU 11 defines the borders of the regions P1 to P5 by the formed border lines q1 to q4. The border line q1 is a half line which extends upward in the color gamut from the target point r3 having the inclination of the region P2. The border line q2 is a half line which extends upward in the color gamut from the target point r1 having the inclination of the region P2. The border line q3 is a half line which extends downward in the color gamut from the target point r1 having the inclination of the region P4. The border line q4 is a half line which extends downward in the color gamut from the apex point of black B' having the inclination of the region P4.

Here, in FIG. 16, the brightness L* of the apex point of saturation H1' indicates an approximate intermediate value of the maximum value 100 of brightness L*. However, there are cases where the brightness L* of the apex point of saturation H1' does not indicate the approximate intermediate value depending on the hue to be cut through. For example, when cut through at the hue of yellow, the brightness L* of the apex point of saturation H1' indicates a higher brightness L* than what is shown in FIG. 16. Further, when cut through at the hue of blue, the brightness L* of the apex point of saturation H1' indicates a lower brightness L* than what is shown in FIG. 16. In such cases, it is preferred that the CPU 11 changes the inclinations of the region P2 and the region P4 according to the inclinations of the lines from the apex point of saturation H1' to the apex point of white W' and to the apex point of black B'.

Next, the CPU 11 calculates the inclination of the line which connects between the input point and the target point r3, the inclination of the line which connects between the input point and the target point r1 and the inclination of the line which connects between the input point and the intermediate point r2. Then, the CPU 11 determines in which region among the regions P1 to P5 the input point exists on the basis on each of the calculated inclinations and the result of comparison in level between the brightness L* of the input point and the brightness L* of the apex point of saturation H1'.

Next, the CPU 11 decides the target point in the color gamut where the input point is to be mapped according to the region where the input point belongs. For example, when the CPU 11 determines that the input point belongs in the region p1, the CPU 11 decides the target point r3 as the target point. Further, when the CPU 11 determines that the input point belongs in the region P3, the CPU 11 decides that the target point r1 as the target point. Furthermore, when the CPU 11 determines that the input point belongs in the region P5, the CPU 11 decides the apex point of black B' as the target point. Moreover, when the CPU 11 determines that the input point belongs in the region P2, the CPU 11 decides the intersection point of the line which connects between the target point r1 and the apex point of white W' or the line which connects between the target point r3 and the intermediate point r2 and the straight line which extends passing through the input point by having the inclination of P2 as the target point. Further, when the CPU 11 determines that the input point belongs in the region P4, the CPU 11 decides the intersection point of the line which connects between the target point r1 and the apex point of white W' or the line which connects between the apex point of black B' and the intermediate point r2 and the straight line which extends passing through the input point by having the inclination of P4 as the target point.

As a result, the CPU 11 can map the input point having L*a*b* value outside of the color gamut at the target point inside the color gamut. Then, the CPU 11 obtains the combination of CMYK values by performing the convergent calculation processing for the target value T' of the target point.

Here, mapping methods according to the rendering intent "Perceptual" and the rendering intent "Saturation" differ from the above described mapping method according to the rendering intent "Relative Colorimatric" in the aspect of the method for dividing the regions and the deciding method of inclinations. Further, mapping is performed while shifting the hue angle h in a part of hues in the rendering intent "Perceptual" and the rendering intent "Saturation" and they can handle reproduction of broad color gamut of RGB which is expected. Especially, in the rendering intent "Saturation", adjustment to control degradation in density and saturation of texts and graphics which are specified by RGB values is carried out. Further, especially in the rendering intent "Perceptual", there are cases where black point correction processing in which L*a*b* values are gradually shifted as a whole including inside of the color gamut to obtain CMYK values corresponding to the L*a*b* values which are shifted so that the value of the darkest black point to be input (L*=0, a*=0, b*=0) can be reproduced by the darkest black point of the color printer.

As described above, the CPU 11 develops the combinations of CMYK values with respect to the LUT input points of L*a*b*: 33×33×33=35937 points to generate the second LUT 200.

Figure 17:
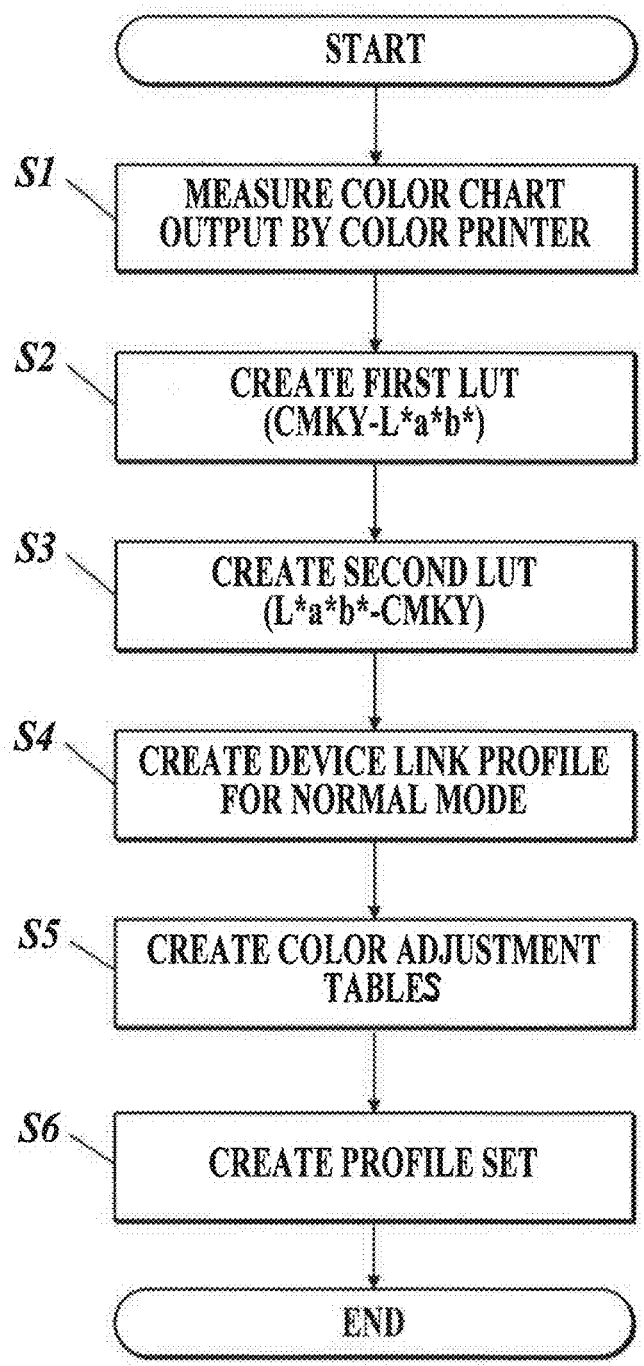
FIG. 17 is a flowchart describing a generation procedure of a device link profile.
Figure 18:
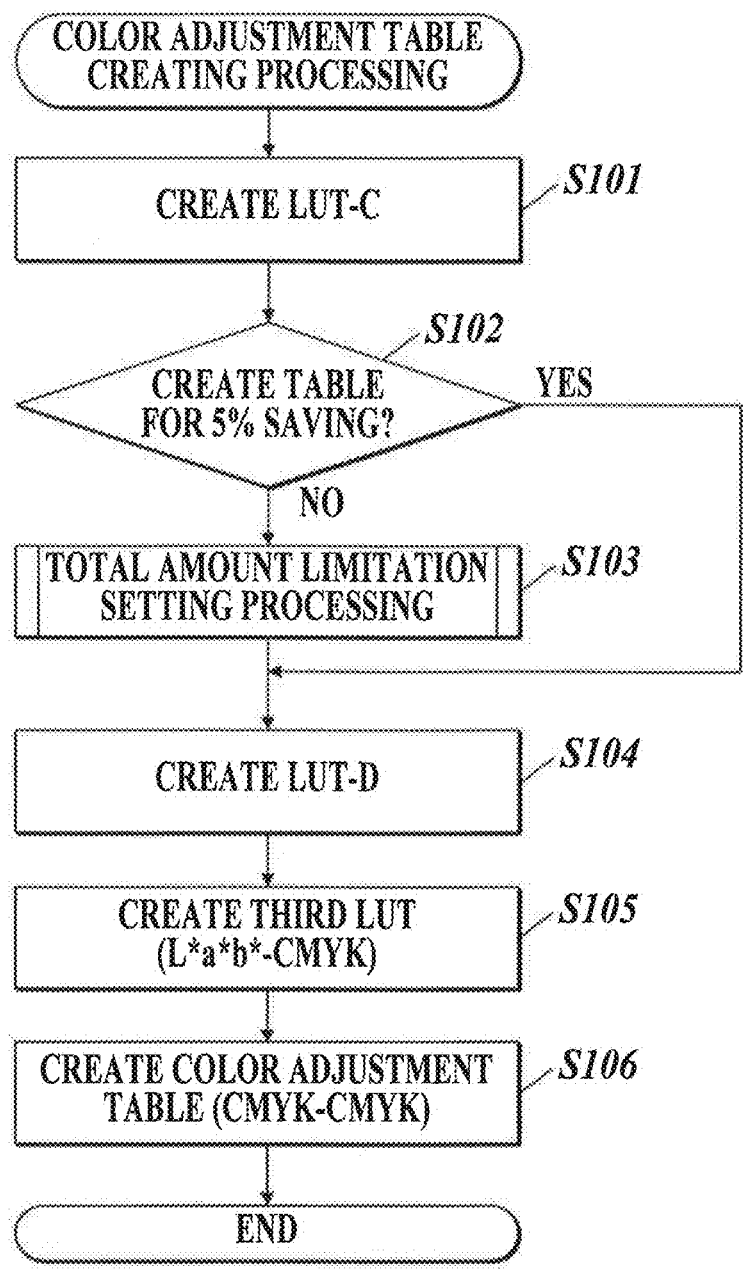
FIG. 18 is a flowchart describing color adjustment table creating processing.

Next, creating procedure of device link profiles which is executed in the color adjustment system 100 will be described with reference to FIG. 17.

First, the color chart 110 shown in FIG. 6 is output by the color printer 1 and measuring of the output color chart 110 is performed by the measuring device 3 as described above (step S1).

Next, on the basis of the result of measurement of the color chart 110, the CPU 11 of the client PC 10 creates the first LUT 100 as described above (step S2).

On the basis of the created first LUT 100, the CPU 11 creates the second LUT 200 for each type of rendering intent as described above (step S3). That is, the CPU 11 creates the second LUT 200 by applying the rendering intent "Perceptual", creates the second LUT 200 by applying the rendering intent "Relative Colorimetric" and creates the second LUT 200 by applying the rendering intent "Saturation".

The CPU 11 creates device link profiles by using the created second LUTs 200 and the source profiles (step S4). In particular, the CPU 11 first creates the device link profile for RGB-CMYK image from the second LUT 200 which is created by applying the rendering intent "Perceptual" and the source profile of RGB format to be used. Further, the CPU 11 creates the device link profile for RGB-CMYK graphic and the device link profile for RGB-CMYK text from the second LUT 200 which is created by applying the rendering intent "Saturation" and the source profile of RGB format to be used. Furthermore, the CPU 11 creates three profiles which are the device link profile for CMYK-CMYK image, the device link profile for CMYK-CMYK graphic and the device link profile for CMYK-CMYK text from the second LUT 200 which is created by applying the rendering intent "Relative Colorimetric" and the source profile of CMYK format to be used. Such creating of device link profiles is performed by the following procedure. That is, the CPU 11 sets the L*a*b* values corresponding to the RGB or CMYK values at the lattice points of the source profile as input values of the second LUT 200 and obtains output values of CMYK by the interpolation calculation. Then, the device link profiles are created by configuring "RGB-CMYK LUT" or "CMYK-CMYK LUT" in which the CMYK values obtained as described above by setting the RGB values or CMYK values at the lattice points of the source profile as LUT input points are the output values. Such device link profiles are device link profiles for normal mode by which color conversion result of normal occasion where decreasing of color materials by the after-mentioned saving mode is not reflected is obtained.

Here, when a sufficient precision cannot be obtained even when output is carried out after performing color conversion to CMYK values form RGB values or CMYK values, feedback processing to perform correction of color differences may be performed to create device link profiles as described in the specification of JP 2011-10231, for example. In particular, first, the color chart 1 on which color conversion to CMYK values from RGB values or CMYK values is performed is output in the color printer 1 and the output color chart is measured by the measuring device 3. Next, L*a*b* values which correspond to CMYK values which are values after being color converted are obtained by interpolation calculation using the first LUT (CMYK-L*a*b* LUT) of the color printer 1 and the L*a*b* values are stored as output target values. Next, color differences in the output target values and the measurement values are obtained. The color differences can be corrected by setting the L*a*b* values of the points obtained by moving from the output target values in the direction opposite of the measurement values for the amounts corresponding to the color differences obtained as described above as the corrected L*a*b* values.

Further, with respect to the created device link profiles, blurriness removing processing or solid-coloring maintaining processing for adjusting the output values so that color conversion will not be performed with other colors being included with respect to the primary colors or the secondary colors generated by CMYK may be carried out as described in JP Patent No. 4470214, JP Patent No. 4470215 and JP 2004-357077, for example.

Moreover, as described in JP Patent No. 3785688, for example, the CMYK values output from the second LUT 200 may be finely adjusted and thereafter, the device link profiles may be created.

Next, the CPU 11 creates color adjustment tables (step S5). The specific creating method of the color adjustment tables will be described later. Here, in the embodiment, creation of color adjustment tables can be omitted according to the setting set by a user.

Next, the CPU 11 creates a profile set in which the created printer profile, device link profiles and color adjustment tables are associated with the source profile which is used and stores the created profile set in the storage unit 16 (step S6).

In the embodiment, the above described procedure is executed corresponding to each type of paper and each type of source profile to be used.

Further, in the embodiment, color adjustment processing for reducing color materials will be performed as described below on the CMYK values obtained as a result of color conversion by using the device link profiles for normal mode which are created as described above.

Next, processing to perform color adjustment which is executed in the color adjustment system 1000 will be described with reference to FIGS. 18 to 24.

First, in preparation for execution of the color adjustment processing, color adjustment tables are created. Here, creating processing of color adjustment tables will be described with reference to FIG. 18. The color adjustment table creating processing is a process which is to be executed by the CPU 11 of the client PC 10. In the embodiment, three color adjustment tables which are a table for 5% saving, a table for 10% saving and a table for 20% saving are created as color adjustment tables. All of the table for 5% saving, the table to 10% saving and the table for 20% saving can be created by the color adjustment table creating processing described below. Here, the number of color adjustment tables to be created can be set arbitrarily, and there may be two or four or more color adjustment tables or there may be only one color adjustment table. Further, each saving amount shown here is a saving amount in which a change in numerical value before and after the conversion from the output CMYK values to the CMYK values after adjustment is obtained by numerical calculation for the entire image, and does not necessarily match the amount of color materials needed for the actual image output. Further, the actual saving amount differs according to the image to be output.

First, the CPU 11 creates LUT-C (step C101). In particular, the CPU 11 creates the LUT-C by the procedure similar to that of the above described LUT-A. Here, the CPU 11 selects the K curve to be used on the basis of information on K curves and information indicating saving amount of color materials stored in the storage unit 16 as described above. In the embodiment, because K curve 0 is the K curve used when the second LUTs 200 were created and the limitation amount of color materials was 400%, K value is calculated by using K curve 1 which is increased by one step comparing to K curve 0 as shown in FIG. 19 when the table for 5% saving is to be created. Further, when the table for 10% saving is to be created, K value is calculated by using K curve 2 which is increased by two steps comparing to K curve 0. Furthermore, when the table for 20% saving is to be created, K value is calculated by using K curve 3 which is increased by three steps comparing to K curve 0. Here, K curve 1 ($K_1$), K curve 2 ($K_2$) and K curve 3 ($K_3$) can be expressed by the following formulas (10) to (12). In the following formulas, min [C, M, Y] are the minimum values of CMY.

$$K_1 = 1.6(\min[C,M,Y]-37.5(\%)) \quad (10)$$

However, $K_1=0(\%)$ when $K_1<0$.

$$K_2 = 1.3333(\min[C,M,Y]-25(\%)) \quad (11)$$

However, $K_2=0(\%)$ when $K_2<0$.

$$K_3 = 1.1429(\min[C,M,Y]-12.5(\%)) \quad (12)$$

However, $K_3=0(\%)$ when $K_3<0$.

In such way, by using the K curve which makes the calculated K value be larger than the K value at the time when the second LUTs 200 were created, the ratio of K value with respect to CMYK values can be greater when the after mentioned third LUT 300 is created comparing to the ratio of K value when the second LUTs 200 were created.

Here, FIG. 19 exemplifies K curve 1 to K curve 3 where all of them are straight lines. However, K curve 1 to K curve 3 may be lines where near their starting points are curved or may be lines which are curved as a whole.

Further, in the embodiment, K curve is set in order to save color materials. However, K curve may be set in consideration of granularity and glossiness of the image to be output or inconsideration of light source (spectral distribution) when observing the image. That is, although the image tends to increase its roughness as K component increases, light source dependency is reduced due to not being effected by spectral distribution. On the other hand, although roughness in the image tends to decrease as K component decreases, light source dependency is increased due to being affected by spectral distribution.

Next, the CPU 11 determines there the color adjustment table to be created is the table for 5% saving (step S102). When the CPU 11 does not determine that the color adjustment table to be created is the table for 5% saving, that is, when the CPU 11 determines that the table to be created is the table for 10% saving or the table for 20% saving (step S102: N), total amount limitation setting processing is executed (step S103). Detail description of the total amount limitation setting processing will be described later. On the other hand, when the CPU 11 determines that the color adjustment table to be created is the table for 5% saving (step S102: Y), the CPU 11 executed the processing of step S104 without executing the processing of step S103.

In step S104, the CPU 11 creates LUT-D (step S104). In particular, the CPU 11 creates the LUT-D by a procedure similar to that of the LUT B described above. Here, the LUT input points in the LUT-D corresponds to the LUT input points in the LUT-C. The CPU 11 obtains L*a*b* values corresponding to the CMYK values which are input in the respective LUT input points of the LUT-C by interpolation calculation using the first LUT 100. Then, by inputting the obtained L*a*b* values in the LUT input points corresponding to the LUT-D, the LUT-D is created.

Next, the CPU 11 creates the third LUT 300 by using the LUT-C and the LUT-D which are created as described above (step S105). The third LUT 300 is similar to the second LUT 200, and is a three dimensional input/four dimensional output LUT in which CMYK values are input with respect to LUT input points of L*a*b* values of L*xa*xb*: 33×33×33=35937 points. The CPU 11 creates the third LUT 300 by a procedure similar to that of the second LUT 200 and stores the created third LUT 300 in the storage unit 16. Here, in the embodiment, when creating the third LUT 300, the rendering intent "Relative Colorimetric" is applied. This is to make the change in colors after performing color adjustment by using the color adjustment tables be small as possible in order to maintain color reproduction accuracy. Here, other type of rendering intent may be applied to create the third LUT 300. Further, the creating method of LUT 300 may not be the same as that in the case of rendering intent "Relative Colorimetric".

The CPU 11 creates the color adjustment tables by using the first LUT 100 and the third LUT 300 which are created as described above (step S106) and ends the processing. In particular, the CPU 11 first obtains output values of CMYK by interpolation calculation by setting the L*a*b* values corresponding as the CMYK values in the lattice points of the first LUT 100 to the input values of the third LUT 300. In the embodiment, there is a case where the output values are CMYK values of after adjustment. Then, by setting the CMYK values in the lattice points of the first LUT 100 as the LUT input points, the CPU 11 creates the color adjustment tables which consist of "CMYK-CMYK LUT" in which the CMYK values of after adjustment obtained as described above are set as output values.

Figure 21:
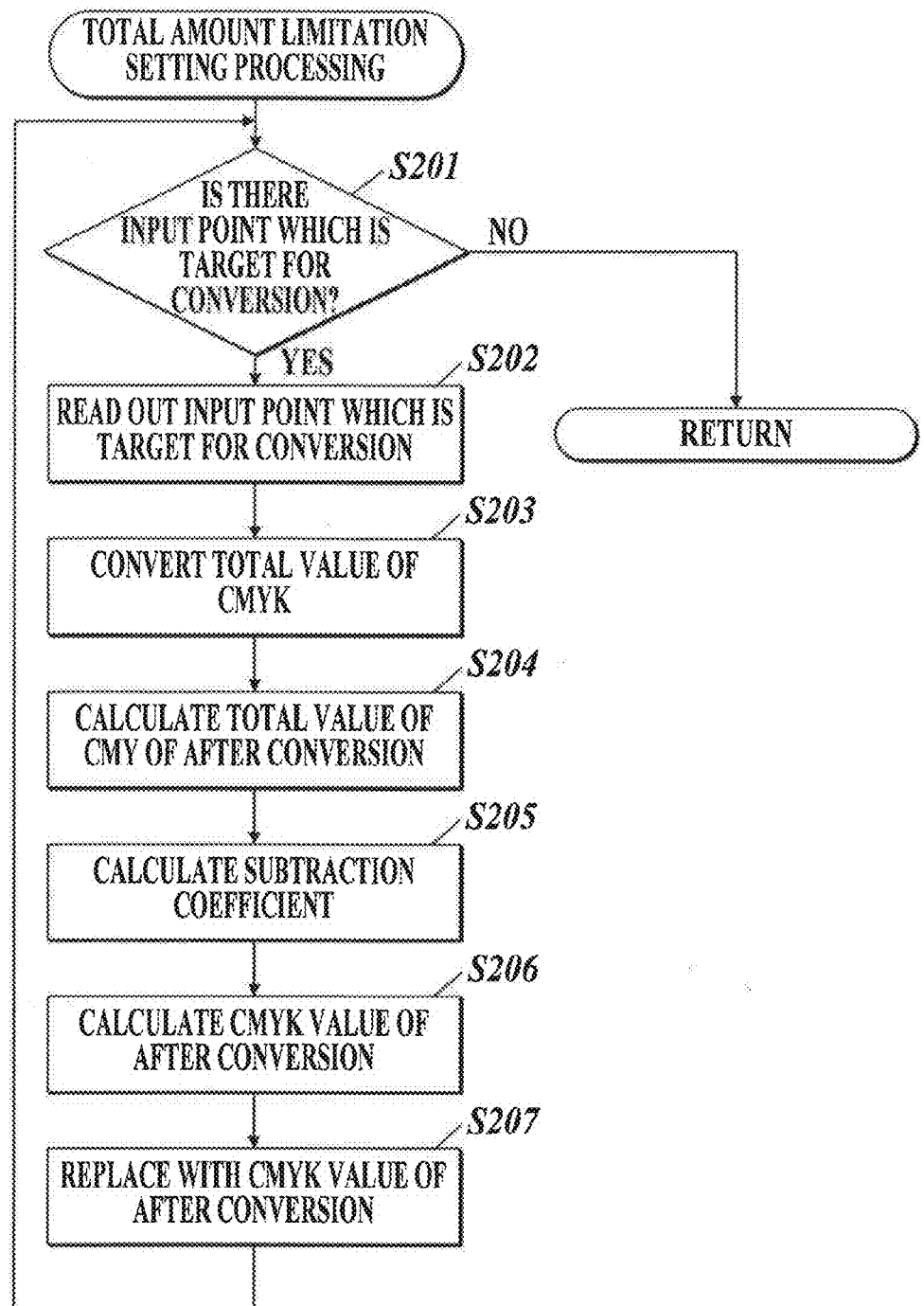
FIG. 21 is a flowchart describing total amount limitation setting processing.

Next, the total amount limitation setting processing which is executed in step S103 of the above described color adjustment table creating processing will be described with reference to FIG. 21.

First, the CPU 11 determines whether there is a LUT input point which is conversion target among the LUT input points in the created LUT-C (step S201). In particular, the CPU 11 performs searching by setting a LUT input point in which the total of CMYK values is 220 to 400% and in which CMYK values are not converted yet as conversion target. Here, the total of CMYK values of a LUT input point set as conversion target can be set arbitrarily.

When the CPU 11 determines that a LUT input point which is conversion target exists (step S201: Y), the CPU 11 reads out the CMYK values described in the LUT input point (step S202).

Then the CPU 11 converts the read CMYK values so that the total thereof be equal to or smaller than a predetermined maximum value (step S203). That is, the CPU 11 converts the total of CMYK values which lays between 220% to 400% so as to be within 220% to the maximum value by using a predetermined one dimensional LUT. Here, the maximum value is decided on the basis of information on K curve and information indicating limitation amount of color materials which are stored along with the second LUTs 200 as described above. In the embodiment, the K curve which is used when the second LUTs 200 were created is K curve 0 and the limitation amount of color materials thereof is 400%. Therefore, for example, the maximum value is set to 330% in a case where the table for 10% saving is to be created and the maximum value is set to 270% in a case where the table for 20% saving is to be created.

Then, the CPU 11 subtracts the K value of before conversion from the total of CMYK values converted in step S203 and calculates the total of CMY values of after conversion (total value of CMY after conversion) (step S204).

Thereafter, the CPU 11 calculates a subtraction coefficient by dividing the total value of CMY after conversion which is calculated in step S204 by the total of CMY values before conversion (total value of CMY before conversion) (step S205).

Then, the CPU 11 multiplies each value of CMY in the LUT input point which is target for reading in step S202 with the subtraction coefficient which is calculated in step S205 and calculates each value of CMY of after conversion (CMY values of after conversion), and also, obtains the CMYK values of after conversion which is obtained by adding the K value of before conversion to the CMY values of after conversion (step S206).

In detail description of the above processing, for example, in a case where the table for 20% saving is to be created, the total of CMYK values is to be 300% when values of CMYK are C=100%, M=100%, Y=75% and K=25%. Then, when the total of CMYK values after being converted by using the one dimensional LUT is 250%, the total of CMY values after conversion is to be 250−25=225%. Because the total of CMY values before conversion is 275%, the subtraction coefficient is to be 225/275=0.818. Then, when the CMY values before conversion are multiplied by this subtraction coefficient, C=81.8%, M=81.8% and Y=61.4% can be obtained. Here, K value is not multiplied by the subtraction coefficient.

When CMYK values after conversion are calculated as described above, the CPU 11 replaces the LUT input point which is target for reading in step S202 with the CMYK values after conversion (step S207) and moves onto the processing of step S201.

The CPU 11 repeatedly executes the processing of step S201 to step S207 until there is no LUT input point which is conversion target, and thereby creates the LUT-C in which the total amount of color material is limited.

Then, when the CPU 11 does not determine that there is a LUT input point which is conversion target in step S201 (step S201: N), the CPU 11 ends the processing.

Figure 22:
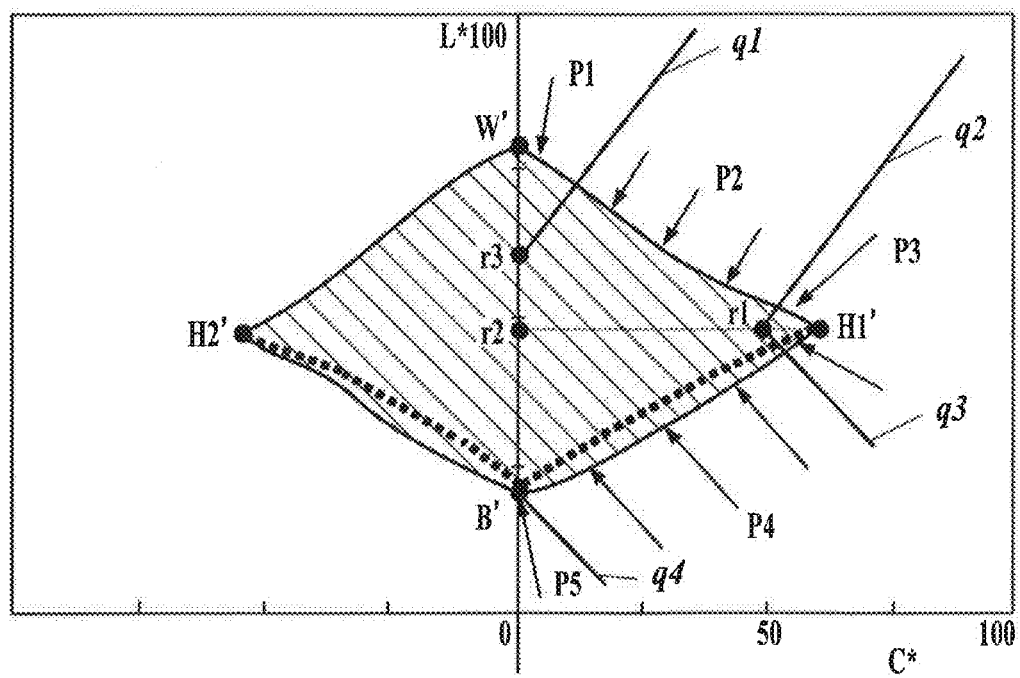
FIG. 22 is a diagram describing change in color gamut.
Figure 23:
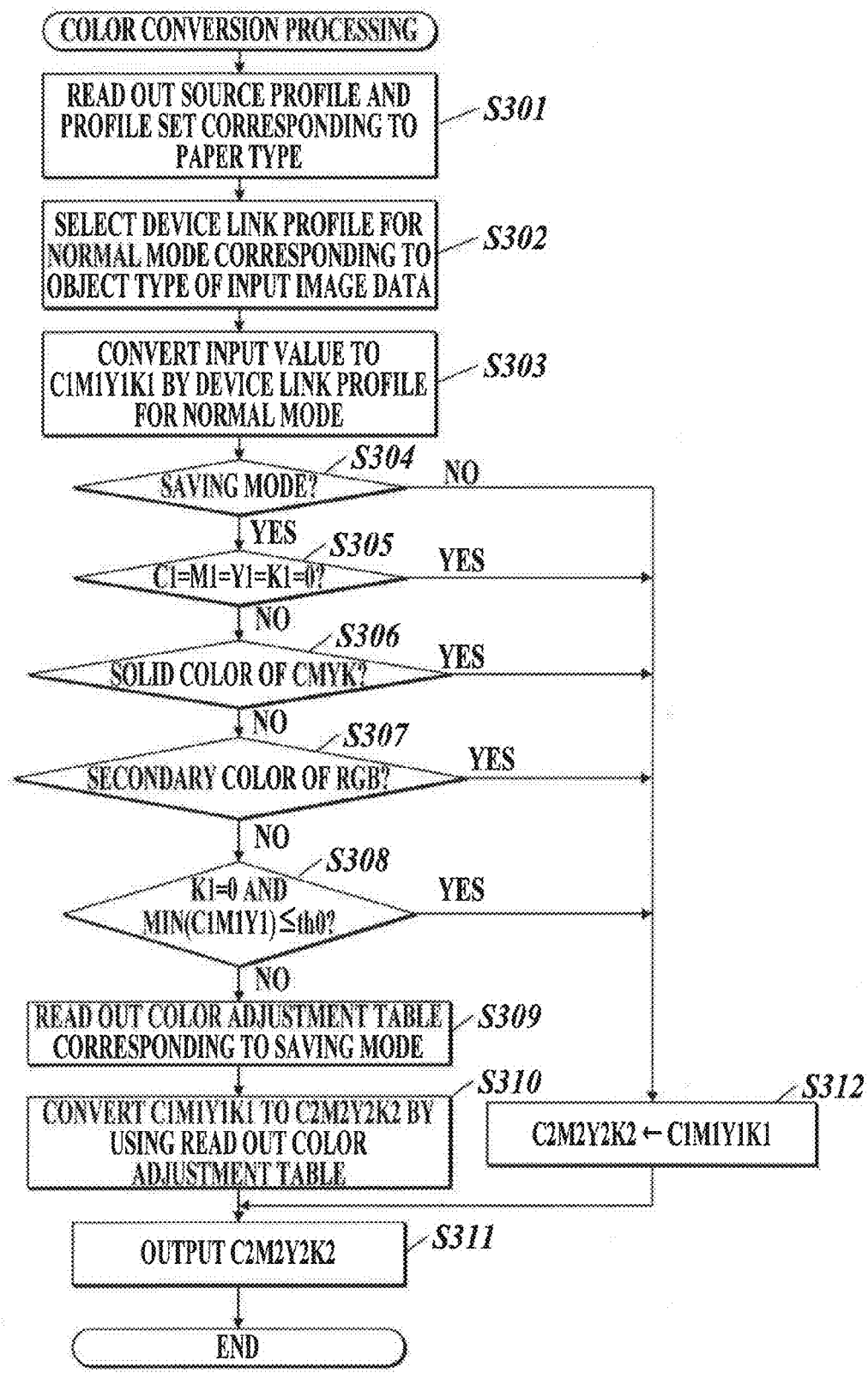
FIG. 23 is a flowchart describing color conversion processing.

As described above, because the CPU 11 creates the third LUT 300 by using the LUT-C in which the total amount of color materials is limited by executing the above described total amount limitation setting processing and the LUT-D, the total of CMYK values will not exceed the maximum value. As a result, for example, in a case where the table for 20% saving is to be created, the lower edges of the color gamut indicated by solid lines are shifted so as to be raised to the positions indicated by dashed lines and the color gamut is narrowed so that the part where brightness is low is raised as shown in FIG. 22. Here, in the embodiment, the total of CMYK, values at each LUT input point in the LUT-C is limited to be 270% or 330% or less. However, the limiting value can be set arbitrarily. Further, because the third LUT 300 in which total amount of color materials is limited is creates on the basis of the LUT-C in which the total of CMYK values at each LUT input points are all limited to be equal to or less than the maximum value, the CMYK values obtained by the third LUT 300 can be smaller values while maintaining their balance. Even in a case where L*a*b* values other than the LUT input points of the third LUT 300 are input, the total of CMYK values will not exceed the limitation value for the colors in the surrounding of the LUT input points and will no abruptly crush to the limitation amount because the CMYK values can be obtained by interpolation from the CMYK values described in the LUT input points which are limited to be equal to or less than the maximum value, and the color change between surrounding colors can be continuous. Further, when creating the LUT-D, because the total of CMYK values is limited at the above described maximum value, L*a*b* values are input by the total amount of color materials being limited by setting the point where the CMY values are at 100% (that is black) as the center in the LUT-D. Further, by setting the limitation amount of color materials so as to be greater than that of when creating the second LUTs 200, the ratio of K value with respect to the CMYK values can be made to be larger when the third LUT 300 is created comparing to that when the second LUTs 200 were created.

Color conversion processing which is to be executed after the color adjustment tables are created as described above will be described with reference to FIG. 23. The color conversion processing is processing executed by a CPU or the like of the controller 2, for example. Further, the color conversion processing is processing for performing color conversion on image data of CMYK or RGB which is input to CMYK data to be output from the color printer 1 and for performing color adjustment for saving color materials. Here, it is assumed that various types of tables such as profiles and the like to be used in the color conversion processing are sent from the client PC 10 and that the profile sets stored in the storage unit of the controller 2 are read out.

First, the controller 2 reads out the source file which is specified by the device that is the sender of the input image data and the profile set which corresponds to the paper type from the storage unit (step S301).

Thereafter, the controller 2 selects the device link profile for normal mode corresponding to the object type of the input image data from the plurality of types of device link profiles for normal mode included in the read profile set (step S302). That is, the controller 2 selects the device link profile for RGB-CMYK image when the object type of the input image data is "RGB IMAGE", the controller 2 selects the device link profile for RGB-CMYK graphic when the object type of the input image data is "RGB GRAPHIC", the controller 2 selects the device link profile for RGB-CMYK text when the object type of the input image data is "RGB TEXT", the controller 2 selects the device link profile for CMYK-CMYK image when the object type of the input image data is "CMYK IMAGE", the controller 2 selects the device link profile for CMYK-CMYK graphic when the object type of the input image data is "CMYK GRAPHIC" and the controller 2 selects the device link profile for CMYK-CMYK text when the object type of the input image data is "CMYK TEXT".

Next, the controller 2 converts the input RGB values or CMYK values to CMYK values by applying the interpolation calculation by using the selected device link profile and sets the converted CMYK values as $C_1M_1Y_1K_1$ (step S303).

In the above case, there are possibilities that image data to which a source profile is included is sent from the client PC 10 or the like. In such cases, the controller 2 performs color conversion by the sent source profile and the second LUT 200 of the printer profile. At this time, the second LUT 200 is switched according to the object type included in the image data to be used.

Then, the controller 2 determines whether mode is the saving mode for saving color materials (step S304). Saving mode is pre-set by a user, for example. When the controller determines that mode is the saving mode (step S304: Y), the controller 2 determines whether all of the $C_1M_1Y_1K_1$ values are 0% (step S305). Then, when the controller 2 does not determine that all of the $C_1M_1Y_1K_1$ values are 0% (step S305: N), the controller 2 determines whether it is a solid color of any one of CMYK (step S306). That is, the controller 2 determines whether it is a solid color according to whether only any one of the values of $C_1M_1Y_1K_1$ is 0%. Then, when the controller 2 does not determine that it is a solid color of an one of CMYK (step S306: N), the controller 2 determines whether it is a secondary color of RGB (step S307). That is, the controller 2 determines whether the color consists of two colors among CMYK. Then, when the controller 2 does not determine that the color is a secondary color of RGB (step S307: N), the controller 2 determines whether $K_1$ value is 0% and whether the smallest value among the values of $C_1M_1Y_1$ is equal to or smaller than a predetermined threshold (th0) (step S308). When the controller 2 does not determine that $K_1$ value is 0% and the smallest value among the values of $C_1M_1Y_1$ is equal to or smaller than the predetermined threshold (step S308: N), the controller 2 executes the processing of step S309. On the other hand, the controller 2 executes the after-mentioned step S312 when the controller 2 does not determine mode is the saving mode in step S304 (step S304: N), when the controller 2 determines that all of the values of $C_1M_1Y_1K_1$ are 0% in step S305 (step S305: Y), when the controller 2 determines that the color is a solid color of any of CMYK is step S306 (step S306: Y), when the controller 2 determines that the color is a secondary color of RGB in step S307 (step S307: Y) and when the controller 2 determines that $K_1$ value is 0% and the smallest value among the values of $C_1M_1Y_1$ is equal to or smaller than the predetermined threshold (step S308: Y).

The colors fulfilling any of the conditions of step S305 to step s308 are colors which are not target for processing for replacing each value of CMYK with K value and processing for limiting the total of CMYK values and are colors which are not changed at all time. When the above processing are performed on the colors which fulfill the conditions in a similar was as in other colors, there are possibilities that calculation errors occur. Therefore, in the embodiment, the processing for saving color materials executed as in below is not carried out in order to alleviate the influence of calculation errors.

The controller 2 reads out the color adjustment table corresponding to the saving mode set in step S309 (step S309). That is, the controller 2 reads out the table for 5% saving when the saving mode which is set is the saving mode to perform 5% saving, the controller 2 reads out the table for 10% saving when the saving mode which is set is the saving mode to perform 10% saving and the controller 2 reads out the table for 20% saving when the saving mode which is set is the saving mode to perform 20% saving.

Then the controller 2 converts the values of $C_1M_1Y_1K_1$ to values of $C_2M_2Y_2K_2$ by using the read color adjustment table (step S110).

Thereafter, the controller 2 outputs the $C_2M_2Y_2K_2$ which are converted as described above (step S311) and ends the processing. The color printer 1 outputs a color image on the basis of the values of $C_2M_2Y_2K_2$ which are output.

On other hand, the controller 2 executes the processing of step S311 by setting the values of $C_1M_1Y_1K_1$ as $C_2M_2Y_2K_2$, the $C_1M_1Y_1K_1$ not being changed, in step S312 (step S312) and executes the processing of step S311. That is, the controller 2 makes the values obtained in step S302 and step S303 be the values to be output by the color printer 1 as they are.

Figure 24:
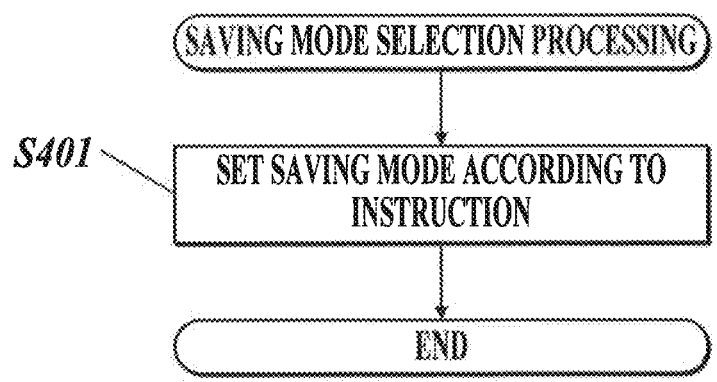
FIG. 24 is a flowchart describing saving mode selection processing.

Next, saving mode selection processing will be described with reference to FIG. 24. The saving mode selection processing is processing executed by the controller 2. Further, the saving mode selection processing is executed when selection instruction of saving mode is sent from the client PC 10.

First, when selection instruction of saving mode is sent from the client PC 10, the controller 2 performs saving mode setting so that the saving mode according to the instruction content is to be executed (step S401). That is, the controller 2 sets any one of the normal mode, the 5% saving mode which performs saving of 5%, the 10% saving mode which performs saving of 10% and the 20% saving mode which performs saving of 20%.

Next, an example of screen transition that is displayed in the display unit 15 in preparation for creating a profile set as described above in the client PC 10 will be described with reference to FIGS. 25 to 33.

Figure 25:
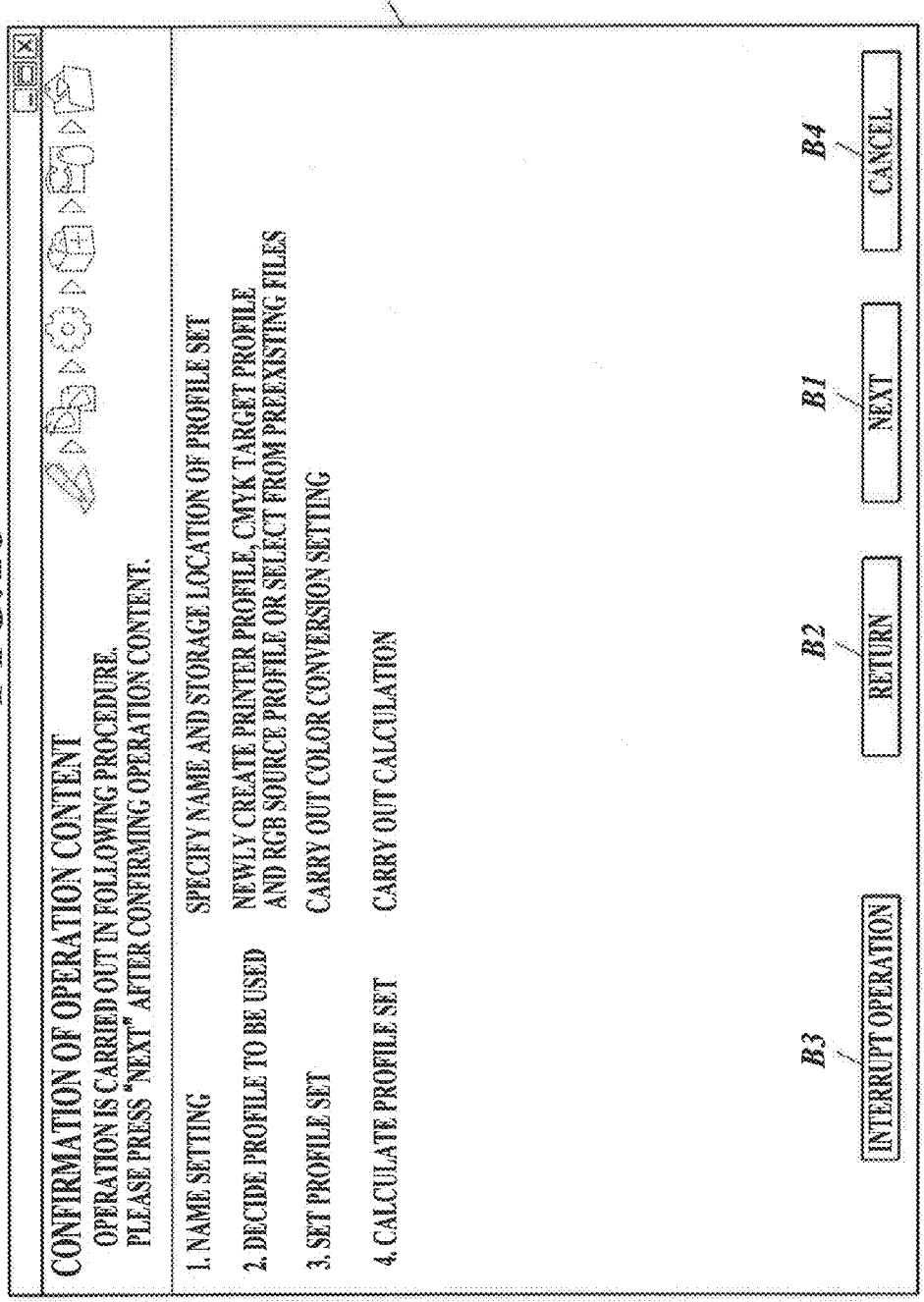
FIG. 25 is a diagram describing a wizard screen for creating a profile set.

When a predetermined setting operation is performed by a user, the CPU 11 of the client PC 10 displays the wizard screen W1 for guiding the profile set creation in the display unit 15 as shown in FIG. 25. In the wizard screen W1, operation content for creating a profile set is shown. Here, at the upper right part in each wizard screen described hereinafter, icons which visually express progress of the operation are displayed. When the "next" button B1 is operated by a user operating the operation unit 14, the CPU 11 switches the screen to be displayed in the display unit 15 to the wizard screen W2 as shown in FIG. 26. Further, when the "return" button B2 is operated by a user, the CPU 11 displays the wizard screen which was previously displayed in the display unit 15 in the display unit 15. when the "interrupt operation" button B3 is operated by a user, the CPU 11 stores the operation up to now and ends the creation operation of profile set. Further, when the "cancel" button B4 is operated by a user, the CPU 11 destroys the operation content up to now and ends the creation operation of profile set. Here, functions of the "return" button B2, the "interrupt operation" button B3 and the "cancel" button B4 are similar in all of wizard screens. Therefore, same reference numerals are used and their descriptions are omitted.

In the wizard screen W2, input of name (profile set name) of the profile set to be created and specifying of storage location are guided as shown in FIG. 26. A user can directly input the profile set name in the text box T1 by operating the operation unit 14. Further, when the "reference" button B5 is operated by a user operation the operation unit 14, the CPU 11 displays an explorer bar which is not shown in the drawing in the display unit 15 and makes a user select the storage place. When the profile set name is input and the storage place is selected, the CPU 11 displays the file name in the column for name of saved file. Thereafter, when the "next" button B6 is operated by a user, the CPU 11 switches the screen to be displayed in the display unit 15 to the wizard screen W3 as shown in FIG. 27.

Figure 27:
FIG. 27 is a diagram describing a wizard screen for creating a profile set.

In the wizard screen W3, selecting of a printer profile and a source profile to be used is guided in preparation for creating a profile as shown in FIG. 27. First, when the "reference" button B7 provided in the "printer profile" is operated by a user operating the operation unit 14, the CPU 11 makes the display unit 15 display the folder window which is not shown in the drawing and makes a user select a printer profile which is stored. Further, when the "reference" button B8 provided in the "CMYK target profile" is operated by a user operating the operation unit 14, the CPU 11 displays the folder window which is not shown in the drawing in the display unit 15 and makes a user select a CMTK source profile which is stored. Moreover, when any one of radio buttons R1 provided in "RGB source profile" is selected by a user operating the operation unit 14, the CPU 11 selects the selected RGB source profile. Here, when "other" is selected among the radio buttons R1, the "reference" button B9 is displayed to be effective. Then, when the "reference" button is operated by a user operating the operation unit 14, the CPU 11 makes the display unit 15 display the folder window which is not shown in the drawing and makes a user select an RGB source profile which is stored.

Here, by the "create new" button B10 provided in "printer profile" and the "create new" button B11 provided in the "CMYK target profile" being operated by a user, a printer profile and a CMYK source profile can be newly created. An example of screen transition displayed in the display unit 15 when a printer profile is newly created will be described.

Figure 28:
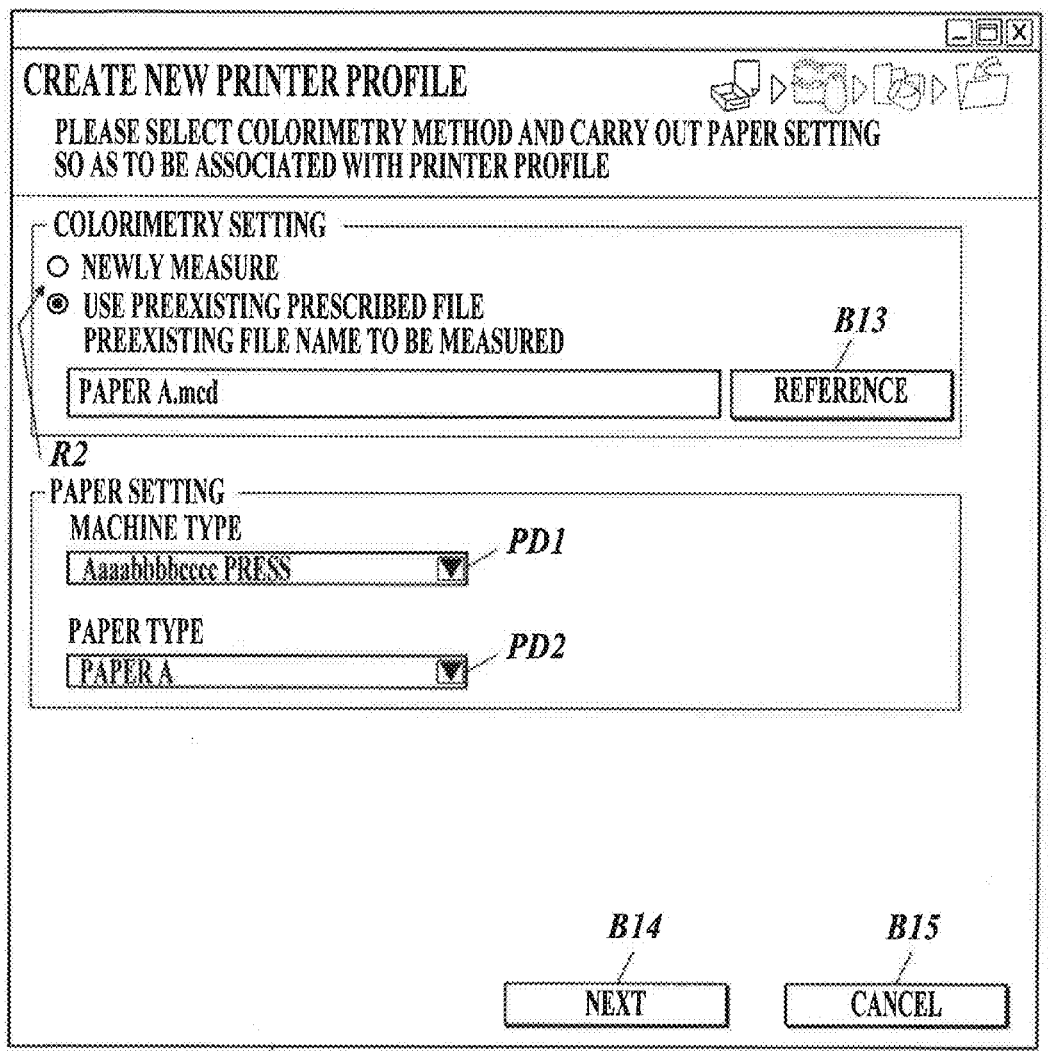
FIG. 28 is a diagram describing a wizard screen for creating a profile set.

In the wizard screen W3, when the "create new" button B10 is operated by a user operating the operating unit 14, the CPU 11 displays the wizard screen W4 in a pop-up manner as shown in FIG. 28 so as to be superimposed on the wizard screen W3 displayed in the display unit 15.

In the wizard screen W4, associating of the colorimetry result, the type of color printer which is target for colorimetry and the paper type is guided as shown in FIG. 28. First, whether colorimetry is to be newly performed or a file in which colorimetry result is recorded is to be called up is selected by a user operating the radio buttons R2 provided in "colorimetry setting". When colorimetry is to be newly performed, a colorimetry result can be obtained by outputting a color chart by the color printer 1 and by measuring the color chart by the measuring device 3 as described above. Further, when a file in which a colorimetry result is recorded is to be called up, the folder window which is not shown in the drawing is displayed by a user operating the "reference" button B13 and a file which is stored can be selected.

Further, the type of color printer which is target for colorimetry can be selected among types of printers listed in the pull-down menu PD1. Furthermore, the paper type can be selected among the paper types listed in the pull-down menu PD2.

Figure 29:
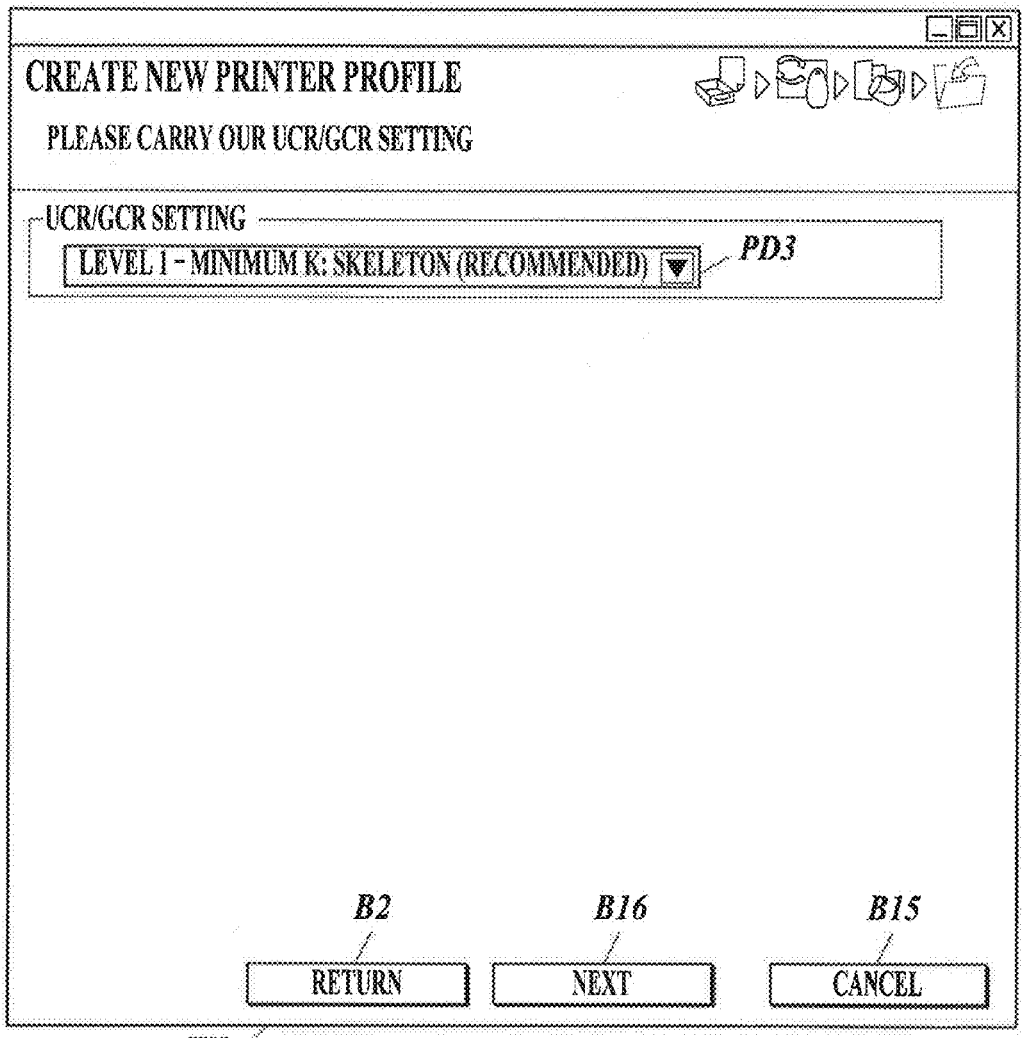
FIG. 29 is a diagram describing a wizard screen for creating a profile set.

After the colorimetry result, the type of color printer and the paper type are selected as described above, when the "next" button B14 is operated by a user operating the operation unit 14, the CPU 11 switches the wizard screen W4 which is displayed in the display unit 15 to the wizard screen W5 shown in FIG. 29. Here, when the "cancel" button B15 is operated by a user, the CPU 11 destroys the setting content which is set in the wizard screen W4 and cancels the wizard screen W4 which is displayed in a pop-up manner. The "cancel" button B15 in the after mentioned wizard screen W5 also functions similarly, therefore, the description will be omitted.

Figure 30:
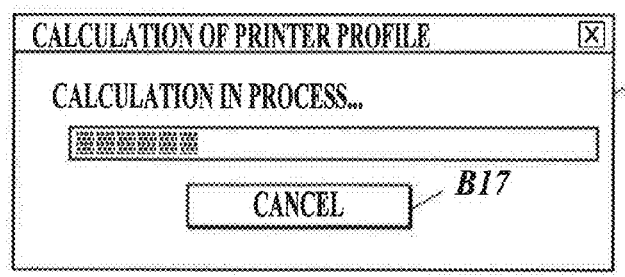
FIG. 30 is a diagram describing a progress-bar screen.

In the wizard screen W5, setting of UCR (Under Color Removal) and GCR (Gray Component Replacement) is guided as shown in FIG. 29. A user can set the level of UCR/GCR by selecting any one of the levels listed in the pull-down menu PD3. The level which is selected here corresponds to the K curve to be used when the printer profile is to be created as described above. The K curve selected here becomes the reference K curve for when creating the color adjustment table. After the level of UCR/GCR is selected, when the "next" button B16 is operated by a user operating the operation unit 14, the CPU 11 creates a printer profile. That is, the CPU 11 creates the first LUT 100 and the second LUTs 200 as described above. During when a printer profile is being created, the CPU 11 makes the display unit 15 display the progress bar PG1 as shown in FIG. 30 to show the progress in creation of printer profile. Here, when the "cancel" button B17 in the progress bar PG1 is operated by a user, the CPU 11 interrupts the creating operation of a printer profile and displays the wizard screen W5.

When creating of a printer profile is completed, the CPU 11 cancels displaying of the wizard screen W5 and the progress bar PG1 and displays the wizard screen W3 again as shown in FIG. 31. At this time, the CPU 11 displays the file name of the created printer profile in the printer profile column in the wizard screen W3. Then, when the "next" button B12 is operated by a user, the CPU 11 switches the screen to be displayed in the display unit 15 to be the wizard screen W6 as shown in FIG. 32.

In the wizard screen W6, setting for creating device link profiles and color adjustment tables is guided as shown in FIG. 32. A user can select the rendering intent to be applied when creating the three profiles which are "device link profile for CMYK-CMYK image", "device link profile for CMYK-CMYK graphic" and "device link profile for CMYK-CMYK graphic" by selecting any one of the rendering intents which are listed in the pull-down menu PD4 provided in the "CMYK-CMYK conversion" by operating the operation unit 14. Further, a user can set whether middle part turbidity is to be removed and solid coloring is to be maintained when CMYK-CMYK conversion is to be performed for each object type by inputting a check in the desired columns in the check box groups of C1 to C3 provided in the "CMYK-CMYK conversion". In each of the check box groups C1 to C3, primary colors of CMYK and secondary colors of RGB can be checked individually and whether middle part turbidity is to be removed and solid coloring is to be maintained can be set individually for primary colors of CMYK and secondary colors of RGB.

Further, a user can select the rendering intent to be applied when creating the "device link profile for RGB-CMYK image" by selecting any one of the rendering intents listed in the pull-down menu PD5 provided in "RGB-CMYK conversion" by operating the operation unit 14. Furthermore, a user can select the rendering intent to be applied when creating the "device link profile for RGB-CMYK graphic" by selecting any one of the rendering intents listed in the pull-down menu PD6 by operating the operation unit 14. Moreover, a user can select the rendering intent to be applied when creating the "device link profile for RGB-CMYK text" by selecting any one of the rendering intents listed in the pull-down menu PD7 by operating the operation unit 14.

In the embodiment, by a user inputting a check in the check box C4 in "conversion for toner saving" in the wizard screen W6, creation of the above described color adjustment table can be instructed. Here, by not checking the check box C4, creating of the color adjustment tables can be omitted. In such way, a great amount of calculation for creating the color adjustment tables can be omitted when toner saving is not carried out or the like and processing efficiency can be improved. Further, securing of memory capacity for storing the color adjustment tables is not needed.

Figure 33:
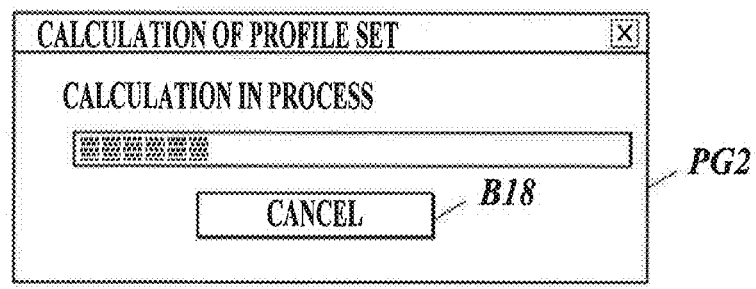
FIG. 33 is a diagram describing a progress-bar screen.

After input in the wizard screen W6 is completed, when the "next" button B17 is operated by a user, the CPU 11 creates a device link profile for each object type and a color adjustment table for each saving mode in accordance with the set content. During when the device link profiles and the color adjustment tables are being created, the CPU 11 makes the display unit 15 display the progress bar PG2 as shown in FIG. 33 to indicate the progress in creating of device link profiles and the like. Here, when the "cancel" button B18 in the progress bar PG2 is operated by a user, the CPU 11 interrupts the creating operation of the device link profiles and the like and displays the wizard screen W6.

When the printer profile, the device link profiles and the color adjustment tables are created as described above, they are to be stored in the storage place in the storage unit 16 as set in the wizard screen W2 along with the source profile which is used when creating these tables as one profile set.

In the embodiment, a profile set is created for each paper type and they are grouped in the same file including the color adjustment tables created as described above. Therefore, a user can easily set the color adjustment following the flow of the wizard as described above and possibility of degradation in accuracy due to setting error can be reduced, and output can be performed in a setting where a high color reproducibility can be obtained.

Figure 34:
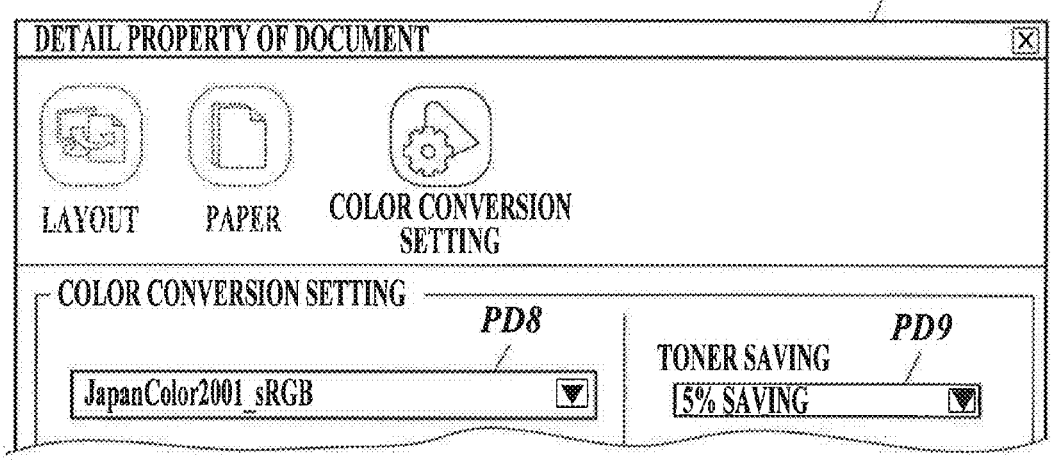
FIG. 34 is a diagram describing a property screen displayed when printing is to be performed.

After a profile set is created as described above, when an output instruction of an image to the color printer 1 from the client PC 10 is executed by a user, the CPU 11 of the client PC 10 makes the display unit 15 display the property screen PP1 as shown in FIG. 34. Here, after selecting the paper type by operating the operation unit 14 (not shown in the drawing), a user can select any one of the profile sets listed in the pull-down menu PD8. The profile sets which are listed in the pull-down menu PD8 are profile sets which is relevant to the paper type selected by a user among the profiles sets stored in the storage unit 16.

Moreover, a user also can select among the toner saving amounts (saving mode) listed in the pull-down menu PD9.

After carrying out the setting as described above, when an output execution instruction is given by an operation by a user, the controller 2 receives the instruction. The controller 2 performs color conversion processing and color adjustment processing on the image data by using the specified profile set and sends the color adjusted and color converted image data to the color printer 1. The color printer 1 forms an image on the specified paper on the basis of the received image data.

Hereinafter, the present invention will be described in detail by using examples. However, it is needless to say that the present invention will not be limited to such examples.

Example 1

Test images of example 1 and comparison example 1 are output in accordance with the following method and saving amounts in color materials thereof are evaluated. In the following example, an image of N3A (fruit basket) among "JIS X 9201:2001 (ISO 12640-1:1997) high definition color digital standard picture image (CMYK/SCID)" is used as the test image. Here, in example 1, the test image of CMYK color image is output by the color printer 1 of color adjustment system 1000 which is applied to the embodiment in 20% saving mode and the test image consisting only of C component, the test image consisting only of M component, the test image consisting only of Y component and the test image consisting only of K component are output by using K color toner. Further, in comparison example 1, the test image of CMYK color image is output by normal mode in which color materials are not saved and the test image consisting only of C component, the test image consisting only of M component, the test image consisting only of Y component and the test image consisting only of K component are output by using K color toner. Here, when outputting the test images of example 1 and comparison example 1, they are all output on regular papers and color conversion is performed by using the device link profile for CMYK-CMYK image included in the profile set corresponding to the CMYK source profile of "Japan Color 2001".

[Result]

By visually observing the obtained test image of CMYK colors of example 1 and the obtained test image of CMYK colors of comparison example 1, it is found out that there is almost no difference in reproducibility.

Further, by visually observing the test image consisting only of C component, the test image consisting only of M component and the test image consisting only of Y component of example 1 and the test image consisting only of C component, the test image consisting only of M component and the test image consisting only of Y component of comparison example 1, it is found out that the amount of color material in each of CMY components in example 1 is reduced comparing to the amount of color material in each of CMY component in comparison example 1, and each test image of example 1 is lighter and the density of each CMY component in the shadow parts, in particular, is lower.

In contrary, by visually observing the test image consisting only of K component of example 1 and the test image consisting only of k component in comparison example 1, it is found out that the amount of color material is greater in K component of example 1 comparing to K component of comparison example 1 and the image is darker as a whole in example 1.

Moreover, by evaluating the used amount of each toner material of CMYK used in the output of test images, when the used amount of toner material in comparison example 1 is set to 100%, the used amount of toner material in example 1 is 75% and it is found out that there was saving of 25%.

Example 2

Test images of example 2 and comparison example 2 are output in accordance with the following method and change in color is evaluated. In the following example, the color chart image of "ISO 12642" is sued as test image. In example 2, the color chart image of CMYK color is output by the color printer 1 of color adjustment system 1000 which is applied to the embodiment in 20% saving mode, and measurement by L*a*b* values is carried out for color patches at a predetermine 809 points. Further, in comparison example 2, the color chart image of CMYK colors in normal mode is output and measurement by L*a*b* values is carried out for color patches at a predetermined 809 points in a similar manner. Then, color difference between example 2 and comparison example 2 is obtained for each color patch, and the average color difference and the maximum color difference are obtained. Here, when outputting the test images of example 2 and comparison example 2, they are output on the regular papers and color conversion is performed by using the device link profile for CMYK-CMYK image included in the profile set corresponding to the CMYK source profile of "Japan Color 2001".

[Result]

As a result, the average color difference between example 2 and comparison example 2 is 1.5 and the maximum color difference thereof is 17.3. From this result, it is found out that the average color difference is small although the maximum color difference is large because the total amount of each component of CMYK is limited, and high definition color reproduction accuracy can be obtained.

As described above, according to the embodiment, device link profiles for converting the input image data to the output CMYK values which are created on the basis of the printer profile including the first LUT 100 for converting the input CMYK values in the color printer 1 to L*a*b* values indicating coordinates in the device-independent color space and the second LUTs 200 which are a plurality of conversion tables created corresponding to a plurality of types of objects indicating the attribution of images and which are for converting the L*a*b* values indicating coordinates in the device-independent color space to the output CMYK values and color adjustment tables for converting the output CMYK values to the adjusted CMYK values which are created on the basis of the third LUT 300 created in accordance with a predetermined color adjustment condition on the basis of the first LUT 100, which is for converting the L*a*b* values indicating coordinates in the device-independent color space to the adjusted CMYK values, and the first LUT 100 are stored in the storage unit 16. The controller 2 obtains the output CMYK values corresponding to the object type indicated by the input image data from the input image data by using a device link profile. The controller 2 obtains the adjusted CMYK values from the output CMYK values by using a color adjustment table. As a result, even when color conversion is to be carried out by preparing a plurality of profiles corresponding to respective objects in order to maintain high color reproduction accuracy, an optimum color adjustment using a color adjustment table can be performed on the image data of after color conversion. Therefore, increase in the number of tables for performing color adjustment can be controlled, and the color adjustment desired by a user such as saving of toner amount can be performed easily due to setting of color adjustment and managing of tables being easy while maintaining high color reproduction accuracy. Further, because color adjustment can be performed after performing color conversion using color conversion tables such as device link profiles, color adjustment result can be reflected without being influenced by color reproducibility even when feedback adjustment for appropriately reproducing the output CMYK values, removing of turbidity, maintaining of solid coloring, individual fine adjustment of output results and like, for example, are carried out on color conversion tables, therefore, it is convenient. Furthermore, the third conversion table can be created by calculation similar to that of when creating the second conversion tables. Therefore, the time needed for creating color adjustment tables can be shortened and processing load can be reduced.

Moreover, according to the embodiment, the controller 2 selects which of the output CMYK values and the adjusted CMYK values are to be set as the CMYK values for the color printer 1 to output the image. As a result, when color adjustment is not performed, by using the CMYK values obtained by the color conversion table as they are, processing can be omitted and processing for performing color adjustment can be omitted, and processing efficiency can be improved.

Further, according to the embodiment, the third LUT 300 is created according to the color adjustment condition which is set so that the ratio of K value with respect to the CMYK value be larger when converting the L*a*b* values indicating coordinates in the device-independent color space to the adjusted CMYK values comparing to when converting the L*a*b* values indicating coordinates in the device-independent color space to the output CMYK values by the second LUT 200. As a result, color materials can be saved while maintaining high color reproduction accuracy.

Furthermore, according to the embodiment, there are plurality of types of color adjustment conditions for when creating the third LUT 300 and a plurality of the third LUTs 300 are created each of which corresponding to each of the plurality of types of color adjustment conditions, and further, a plurality of color adjustment tables respectively corresponding to the plurality of third LUTs 300 which are created are stored in the storage unit 16. The controller 2 selects any one among the plurality of color adjustment tables which are sent from the client PC 10 and stored in the controller 2 and obtains the adjusted CMYK values from the output CMYK values by using the selected color adjustment table. As a result, color adjustment table of different color adjustment condition can be set in consideration of color reproduction accuracy and the like, and therefore, convenience is improved.

Moreover, according to the embodiment, there are a plurality of types of color adjustment condition for when creating the third LUT 300, each of the plurality of types of color adjustment condition is set so that the ratio of K value with respect to the CMYK values when converting the L*a*b* values indicating a coordinate in the device-independent color space to adjusted CMYK values is different from each other, a plurality of third LUTs 300 are created so as to correspond respectively to the plurality of types of color adjustment conditions and a plurality of color adjustment tables corresponding respectively to the plurality of third LUTs 300 which are created are stored in the storage unit 16.

The controller 2 selected any one among the plurality of color adjustment tables which are sent from the client PC 10 and stored in the controller 2 and obtains the adjusted CMYK values from the output CMYK values by using the selected color adjustment table. As a result, color adjustment tables having different saving amounts can be set in consideration of color reproduction accuracy and the like, therefore, convenience is improved.

Further, according to the embodiment, the third LUT 300 converts the L*a*b* values indicating a coordinate in the device-independent color space which is not included in the color gamut of the color printer 1 to CMYK values corresponding to L*a*b* values indicating a coordinate which is obtained by relatively shifting so as to be inside the color gamut of the color printer 1. As a result, change in color after color adjustment is performed is made to be small as possible, and high color reproduction accuracy can be realized within the color gamut of the output device such as a color printer.

Furthermore, according to the embodiment, the first LUT 100 is created by applying any one among the plurality of types of printing conditions. The controller 2 selects any one among the plurality of types of printing conditions and obtains the output CMYK values corresponding to the object type indicated by the input image data from the input image data by using a plurality of device link profiles included in a profile set corresponding to the selected printing condition among a plurality of profile sets, the plurality of device link profiles and the plurality of color adjustment tables being associated with a printing condition applied to the first LUT 100 on which the device link profiles and the color adjustment tables are based on. The controller 2 obtains the adjusted CMYK values from the output CMYK values by using a color adjustment table included in the profile set corresponding to the selected printing condition. As a result, color conversion and color adjustment can be performed according to printing conditions having different color reproducibility, such as paper types and the like, and high color reproduction accuracy can be maintained.

Here, the description of the embodiment of the present invention is an example of color adjustment system according to the present invention, and the present invention is not limited to the above description. Detail configuration and detail operation of each functional part constituting the color adjustment system can be modified arbitrarily.

Figure 35:
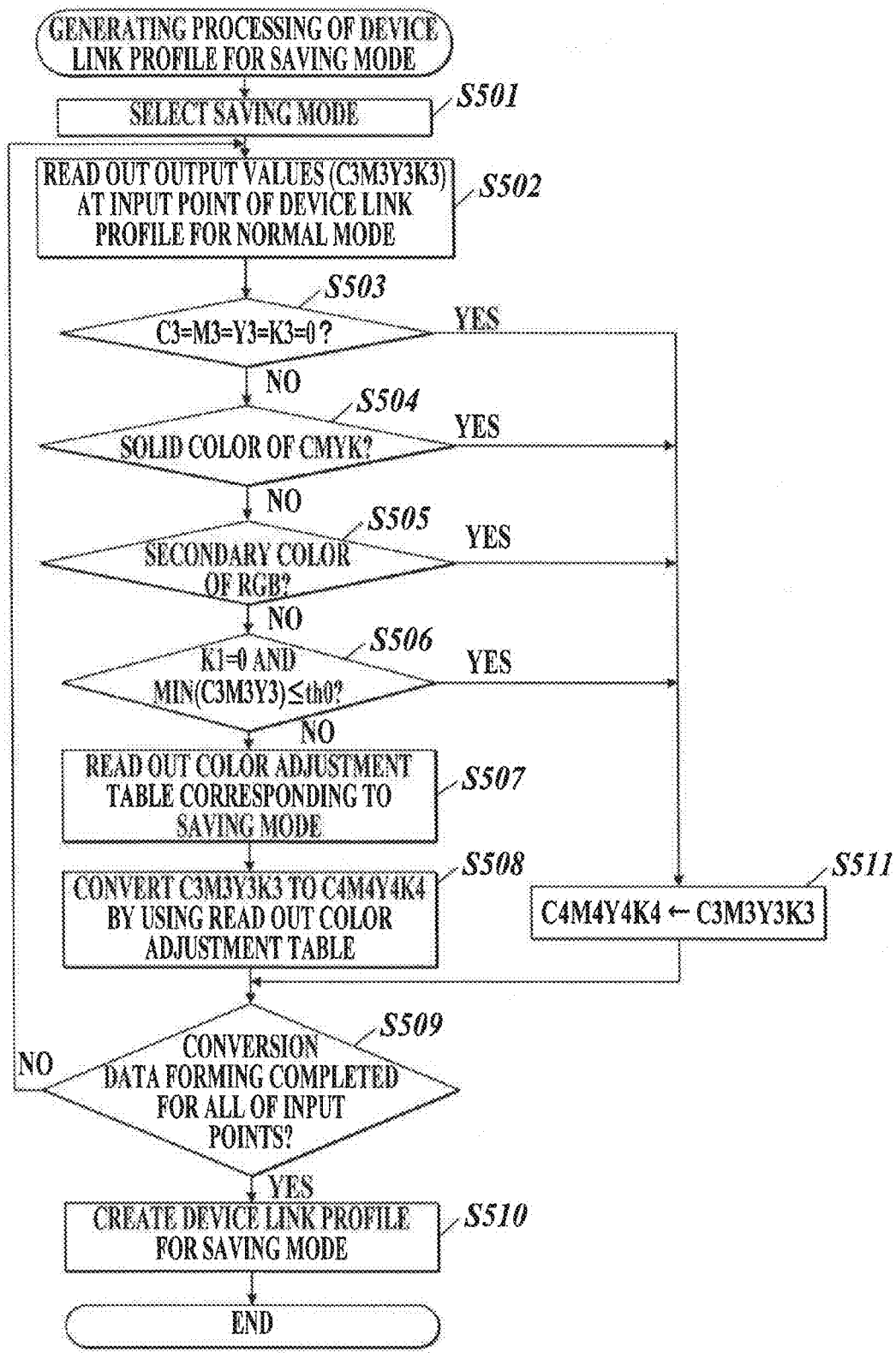
FIG. 35 is a flowchart explaining devise link profile for saving mode generation processing.

Moreover, in the embodiment, color adjustment processing for saving color materials is performed by using the color adjustment tables after color conversion is performed on the basis of the source profiles and the destination profile. However, for example, a device link profile for saving mode in which RGB/CMYK values of LUT input points of the source profile and the adjusted CMYK values obtained by the color adjustment processing are associated can be created, and then, color conversion processing can be performed on the basis of the created device link profile for saving mode. Here, the device link profile for saving mode generating processing which is an example of processing for creating the device link profiles for saving mode will be described with reference to FIG. 35. The device link profile for saving mode generating processing is processing executed by the CPU 11 of the client PC 10, for example. Here, in the description of the device link profile for saving mode generating processing, only an outline will be described for the processing that overlaps with the color conversion processing shown in FIG. 23 and detail descriptions thereof will be omitted.

First, the CPU 11 performs selecting of saving mode (step S501). In particular, in the selecting of saving mode, the saving mode which is set in the saving mode selection processing shown in FIG. 24 is selected.

Next, the CPU 11 reads out the device link profile for normal mode which is stored in the storage unit 16 and reads out the output CMYK values corresponding to the RGB values or CMYK values input in one LUT input point from the device link profile for normal mode and sets the output CMYK values which are read out as $C_3M_3Y_3K_3$ (step S502).

Then, the CPU 11 determines whether all of the $C_3M_3Y_3K_3$ values are 0% (step S503). When the CPU 11 does not determine that all of the $C_3M_3Y_3K_3$ values are 0% (step S503: N), the CPU 11 determines whether the LUT input point is a solid color of any one of CMYK (step S504). Then, when the CPU 11 does not determine that the LUT input point is a solid color of any of CMYK (step S504: N), the CPU 11 determines whether the LUT input point is a secondary color of RGB (step S505). When the CPU 11 does no determine that the LUT input point is a secondary color of RGB (step S505: N), the CPU 11 determines whether the value of $K_3$ is 0% and the smallest value among the values of $C_3M_3Y_3$ is equal to or smaller than a predetermined threshold (step S506).

When the CPU 11 does not determined that the value of $K_3$ is 0% and the smallest value among the values of $C_3M_3Y_3$ is equal to or smaller than a predetermined threshold (step S506: N), the CPU 11 reads out the color adjustment table corresponding to the set saving mode (step S507).

The CPU 11 converts the values of $C_3M_3Y_3K_3$ to $C_4M_4Y_4K_4$ by using the color adjustment table which is read out (step S508).

The CPU 11 determines whether creating of conversion data is completed for all of LUT input points in the device link profile for normal mode (step S509). That is, the CPU 11 determines whether conversion data for converting to the CMYK values of after conversion is created for all of LUT input points in the device link profile for normal mode.

When the CPU 11 does not determined that creating of conversion data is completed for all of LUT input points (step S509: N), the CPU 11 switches to step S502 and performs the processing described above on other output CMYK values in which conversion data for converting to the CMYK values of after conversion is not created. On the other hand, when the CPU 11 determines that creating of conversion data is completed for all of LUT input points (step S509: Y), the CPU 11 associates the input RGB values or the input CMYK values of the device link profile for normal mode with $C_4M_4Y_4K_4$ sets the RGB values or the CMYK values at the lattice points in the source profile as LUT input points and creates the device link profile for saving mode in which the $C_4M_4Y_4K_4$ corresponding to each LUT input point is set as an output value and stores the created device link profile for saving mode in the storage unit 16 (step S510), and thereafter, ends the processing.

Further, when the CPU 11 determines that all of $C_3M_3Y_3K_3$ values are 0% in (step S503), when the CPU 11 determines that the LUT input point is a solid color of any one of CMYK in step S504 (step S504: Y), when the CPU 11 determines that the LUT input point is a secondary color of RGB in step S505 (step S505: Y) and when the CPU 11 determines that the value of $K_3$ is 0% and the smallest value among the values of $C_3M_3Y_3$ is equal to or smaller than a predetermined threshold (step S506: Y), the CPU 11 executes the processing of step S509 by setting $C_3M_3Y_3K_3$ as $C_4M_4Y_4K_4$ the values of $C_3M_3Y_3K$ not being changed (step S511).

The above processing is performed for the entire device link profiles included in on profile set. That is, the CPU 11 creates the device link profile for saving mode (for RGB-CMYK image) from the device link profile for RGB-CMYK image and the color adjustment table corresponding to the selected saving mode by the above described processing. Further, the CPU 11 creates the device link profile for saving mode (for RGB-CMYK graphic) from the device link profile for RGB-CMYK graphic and the color adjustment table corresponding to the selected saving mode by the above described processing. Furthermore, the CPU 11 creates the device link profile for saving mode (for RGB-CMYK text) from the device link profile for RGB-CMYK text and the color adjustment table corresponding to the selected saving mode by the above described processing. Moreover, the CPU 11 creates the device link profiles for saving mode (for CMYK-CMYK image, for CMYK-CMYK graphic and for CMYK-CMYK text) from the device link profile for CMYK-CMYK image, the device link profile for CMYK-CMYK graphic and the device link profile for CMYK-CMYK text, respectively, and the color adjustment table corresponding to the selected saving mode.

Further, these device link profiles for saving mode are created for every profile set.

Moreover, in the embodiment, tables such as various types of profiles or the like are created in the client PC 10 and processing for saving color materials is executed in the controller 2. However, configuration may be such that the creating of tables and the processing for saving color materials are performed in either one of the client PC and the controller.

Further, functions of the client PC and the controller may be realized in one apparatus.

Furthermore, functions of the client PC and the controller may be included in the color printer.

Moreover, in the embodiment, input values and output values are expressed by values between 0 and 100%, the maximum value being 100%. However, the maximum value may be 255 which is the maximum value of 1 bite, and input values and output values may be expressed by values between 0 and 255.

Further, in the embodiment, the present invention can be applied to various types of color printers such as electrophotographic type, inkjet type and the like.

Furthermore, in the embodiment, a color printer of four colors of CMYK is used. However, for example, the present invention can be applied to a color printer including other colors such as light cyan, light magenta and the like.

Moreover, in the embodiment, various types of tables such as profiles and the like created in the client PC 10 are stored in the storage unit 16 and the tables needed for color conversion are stored in the controller 2. However, a part of or all of the various types of tables which are created can be stored in the controller 2.

Further, in the embodiment, the processing for saving color materials is not performed on color data of CMYK in which saving of color materials is not to be performed and output is performed by the color printer 1 on the basis of the CMYK values obtained by the normal color conversion processing. However, the processing for saving color materials may be performed on the color data of CMYK in which saving of color materials is not to be performed. For example, with respect to the CMYK values in which saving of color materials is not to be performed, a color adjustment table can be configured so as not to change the CMYK values to be output.

Furthermore, in the embodiment, the color adjustment system 100 which obtains CMYK values by inputting both the image data of RGB colors and the image data of CMYK colors is being referred to. However, it may be a color adjustment system which obtains CMYK values by inputting only image data of either one of CMYK colors and RGB colors.

Moreover, in the embodiment, color adjustment is performed by using color adjustment tables for carrying out saving of color materials. However, for example, color adjustment may be performed on the output CMYK values by creating a color adjustment table for converting to colors which a user desires.

Further, in the embodiment, saving of color materials is carried out by decreasing CMY components and increasing K component by using K version generation curves and the color adjustment tables in which the total amount of CMYK components is limited. However, saving of color materials may be carried out by only either of the K version generation curves and the color adjustment tables in which the total amount of CMYK components is limited.

Furthermore, in the embodiment, device link profiles are created in a normal color conversion processing and color conversion is performed by using these device link profiles. However, color conversion may be performed by using the source profiles and the printer profile without creating the device link profiles.

Moreover, in the embodiment, color adjustment tables are created on the basis of the first LUT and the third LUTs and color adjustment is performed by using these color adjustment tables. However, color adjustment may be performed by using the first. LUT and the third LUTs without creating the color adjustment tables.

Further, in the embodiment, an example where a hard disk, a semiconductor non-volatile memory and the like are used as a computer readable medium storing the program of the present invention is described. However, the present invention is not limited to such example. A portable recording medium such as CD-ROM may be used as other computer readable medium. Further, carrier wave may be used as a medium to provide data of the program of the present invention via a communication circuit.

The entire disclosure of Japanese Patent Application No. 2011-231379 filed on Oct. 21, 2011 is incorporated herein by reference in its entirety.

What is claimed is:

1. A color adjustment, method, comprising:
    color converting to obtain output CMYK values corresponding to an object indicated by input image data from the input image data by using a color conversion table for converting the input image data to the output CMYK values which is created on the basis of an output device profile, the output device, profile comprising a first conversion table for converting input CMYK values in an output device to a color value indicating a coordinate in a device-independent color space and a second conversion table for converting the color value indicating the coordinate in the device-independent color space to the output CMYK values wherein the second conversion table includes a plurality of conversion tables which are created so as to correspond respectively to a plurality of types of objects indicating image attributions on the basis of the first conversion table; and
    color adjusting to obtain adjusted CMYK values from the output CMYK values by using a color adjustment table for converting the output CMYK values to the adjusted CMYK values, the color adjustment table being created on the basis of a third conversion table for converting the color value indicating the coordinate in the device-independent color space to the adjusted CMYK values and the first conversion table, the third conversion table being created in accordance with a predetermined color adjustment condition on the basis of the first conversion table.

2. The color adjustment method of claim 1 further comprising:
selecting which of the output CMYK values obtained in the color converting and the adjusted CMYK values obtained in the color adjusting be CMYK values used by the output device to output an image.

3. The color adjustment method of claim 1, wherein the third conversion table includes a conversion table which is created in accordance with a color adjustment condition which is set so that a ratio of a K value with respect to CMYK values be larger when converting the color value indicating the coordinate in the device-independent color space to the adjusted CMYK values by using the conversion table comparing to when converting the color value indicating the coordinate in the device-independent color space to the output CMYK values by using the second conversion table.

4. The color adjustment method of claim 3 further comprising selecting any one among a plurality of color adjustment tables,
wherein
the color adjustment condition for when creating the third conversion table includes a plurality of types of color adjustment conditions,
each of the plurality of types of color adjustment conditions is set so that the ratio of the K value with respect to the CMYK values when converting the color value indicating the coordinate in the device-independent color space to the adjusted CMYK values be different from each other,
a plurality of third conversion tables are created so as to correspond respectively to the plurality of types of color adjustment conditions,
a plurality of color adjustment tables are created so as to correspond respectively to the plurality of third conversion tables, and
the adjusted CMYK, values are obtained from the output CMYK values in the color adjusting by using the color adjustment table selected in the selecting.

5. The color adjustment method of claim 1 further comprising selecting any one among a plurality of color adjustment tables,
wherein
the color adjustment condition for when creating the third conversion table includes a plurality of types of color adjustment conditions,
a plurality of third conversion tables are created so as to correspond respectively to the plurality of types of color adjustment conditions,
a plurality of color adjustment tables are created so as to correspond respectively to the plurality of third conversion tables, and
the adjusted CMYK values are obtained from the output CMYK values in the color adjusting by using the color adjustment table selected in the selecting.

6. The color adjustment method of claim 1, wherein the third conversion table is for converting a color value indicating a coordinate in the device-independent color space which is not included in a color gamut of the output device to CMYK values corresponding to a color value indicating a coordinate obtained by being relatively shifted so as to be in the color gamut of the device.

7. The color adjustment method of claim 1 further comprising selecting any one among a plurality of types of printing conditions,
wherein
the first conversion table is created by applying any one among the plurality of types of printing conditions,
the output CMYK values corresponding to the object indicated by the input image data are obtained from the input image data in the color converting by using the plurality of color conversion tables included in a profile set that corresponds to the printing condition selected in the selecting among a plurality of profile sets, the plurality of color conversion tables and the color adjustment table being associated with a printing condition applied to the first conversion table on which the color conversion tables and the color adjustment table are based on in each of the profile sets,
the adjusted CMYK values are obtained from the output CMYK values in the color adjusting by using the color adjustment table included in the profile set corresponding to the printing condition selected in the selecting.

8. The color adjustment method of claim 7 wherein the printing conditions include a paper type.

9. A color adjustment apparatus, comprising:
a storage unit which stores (1) a color conversion table for converting input image data to output CMYK values which is created on the basis of an output device profile, the output device profile comprising a first conversion table for converting input CMYK values in an output device to a color value indicating a coordinate in a device-independent color space and a second conversion table for converting the color value indicating the coordinate in the device-independent color space to the output CMYK values wherein the second conversion table includes a plurality of conversion tables which are created so as to correspond respectively to a plurality of types of objects indicating image attributions on the basis of the first conversion table and (2) a color adjustment table for converting the output CMYK values to the adjusted CMYK values, the color adjustment table being created on the basis of a third conversion table for converting the color value indicating the coordinate in the device-independent color space to the adjusted CMYK values and the first conversion table, the third conversion table being created in accordance with a predetermined, color adjustment condition on the basis of the first conversion table; and
a control unit which obtains the output CMYK values corresponding to an object indicated by the input image data from the input image data by using the color conversion tables and obtains the adjusted CMYK values from the output CMYK values by using the color adjustment table.

10. The color adjustment apparatus of claim 9, wherein the control unit selected which of the output CMYK values and the adjusted CMYK values are to be CMYK values used by the output device to output an image.

11. The color adjustment apparatus of claim 9 wherein the third conversion table includes a conversion table which is created in accordance with a color adjustment, condition which is set so that a ratio of a K value with respect to CMYK values be larger when converting the color value indicating the coordinate in the device-independent, color space to the adjusted CMYK values by using the conversion table comparing to when converting the color value indicating the coordinate in the device-independent color space to the output CMYK values by using the second conversion table.

12. The color adjustment apparatus of claim 11, wherein
the color adjustment condition of when creating the third conversion table includes a plurality of types of color adjustment conditions,
each of the plurality of types of color adjustment conditions is set so that the ratio of the K value with respect to the CMYK values when converting the color value indicating the coordinate in the device-independent color space to the adjusted CMYK values be different from each other,
a plurality of third conversion tables are created so as to correspond respectively to the plurality of types of color adjustment conditions,
a plurality of color adjustment tables corresponding respectively to the plurality of third conversion tables are stored in the storage unit, and
the control unit selects any one among the plurality of color adjustment tables and obtains the adjusted CMYK values from the output CMYK values by using the selected color adjustment table.

13. The color adjustment apparatus of claim 9, wherein
the color adjustment condition of when creating the third conversion table includes a plurality of types of color adjustment conditions,
a plurality of third conversion tables are created, so as to correspond respectively to the plurality of types of color adjustment conditions,
a plurality of color adjustment tables corresponding respectively to the plurality of third conversion tables are stored in the storage unit, and
the control unit selects any one among the plurality of color adjustment tables and obtains the adjusted CMYK values from the output CMYK values by using the selected color adjustment table.

14. The color adjustment apparatus of claim 9 wherein
the third conversion table is for converting a color value indicating coordinate in the device independent color space which is not included in a color gamut of the output device to CMYK values corresponding to a color value indicating a coordinate obtained by being relatively shifted so as to be in the color gamut of the device.

15. The color adjustment apparatus of claim 9, wherein
the first conversion table is created by applying any one among a plurality of types of printing conditions, and
the control unit selects any one among the plurality of types of printing conditions,
the control unit obtains the output CMYK values corresponding to the object indicated by the input image data from the input image data by using the plurality of color conversion tables included in a profile set that corresponds to the selected printing condition among a plurality of profile sets, the plurality of color conversion tables and the color adjustment table being associated with a printing condition applied to the first conversion table on which the color conversion tables and the color adjustment table are based on in each of the profile sets, and
the control unit obtains the adjusted CMYK values from the output CMYK values by using the color adjustment table included in the profile set corresponding to the selected printing condition.

16. The color adjustment apparatus of claim 15, wherein the printing conditions include a paper type.

17. A non-transitory computer-readable recording medium storing a program, wherein the program makes the computer function as a control unit (1) which obtains output CMYK values corresponding to an object indicated by input image data from the input image data by using a color conversion table for converting input image data to the output CMYK values which is created on the basis of an output device profile, the output device profile comprising a first conversion table for converting input CMYK values in an output device to a color value indicating coordinate in a device-independent color space and a second conversion table for converting the color value indicating the coordinate in the device-independent color space to the output CMYK values wherein the second conversion table includes a plurality of conversion tables which are created so as to correspond respectively to a plurality of types of objects indicating image attributions on the basis of the first conversion table and (2) which obtains adjusted CMYK values from the output CMYK values by using a color adjustment table for converting the output CMYK values to the adjusted CMYK values, the color adjustment table being created on the basis of a third conversion table for converting the color value indicating the coordinate in the device-independent color space to the adjusted CMYK values and the first conversion table, the third conversion table being created in accordance with a predetermined color adjustment condition on the basis of the first conversion table.

18. The non-transitory computer-readable recording medium of claim 17, wherein the control unit selected which of the output CMYK values and the adjusted CMYK values are to be CMYK values used by the output device to output an image.

19. The non-transitory computer-readable recording medium of claim 17, wherein the third conversion table includes a conversion table which is created in accordance with a color adjustment condition which is set so that a ratio of a K value with respect to CMYK values be larger when converting the color value indicating the coordinate in the device-independent color space to the adjusted CMYK values by using the conversion table comparing to when converting the color value indicating the coordinate in the device-independent color space to the output CMYK values by using the second conversion table.

20. The non-transitory computer-readable recording medium of claim 17, wherein
the color adjustment condition of when creating the third conversion table includes a plurality of types of color adjustment conditions,
a plurality of third conversion tables are created so as to correspond respectively to the plurality of types of color adjustment conditions,
a plurality of color adjustment tables are created so as to correspond respectively to the plurality of third conversion tables, and
the control unit selects any one among the plurality of color adjustment tables and obtains the adjusted CMYK values from the output CMYK values by using the selected color adjustment table.

21. The non-transitory computer-readable recording medium of claim 17, wherein
the color adjustment condition of when creating the third conversion table includes a plurality of types of color adjustment conditions,
each of the plurality of types of color adjustment conditions is set so that the ratio of the K value with respect to the CMYK values when converting the color value indicating the coordinate in the device-independent color space to the adjusted CMYK values be different from each other, a plurality of third conversion tables are created so as to correspond respectively to the plurality of types of color adjustment conditions, a plurality of color adjustment tables axe created so as to correspond respectively to the plurality of third conversion tables, and the control unit selects any one among the plurality of color adjustment tables and obtains the adjusted CMYK values from the output CMYK values by using the selected color adjustment table.

22. The non-transitory computer-readable recording medium of claim 17, wherein the third conversion table is for converting color a value indicating a coordinate in the device-independent color space which is not included in a color gamut of the output device to CMYK values corresponding to a color value indicating a coordinate obtained by being relatively shifted so as to be in the color gamut of the device.

23. The non-transitory computer-readable recording medium of claim 17, wherein the first conversion table is created by applying any one among a plurality of types of printing conditions, and the control unit selects any one among the plurality of types of printing conditions, the control unit obtains the output CMYK values corresponding to the object indicated by the input image data from the input image data by using the plurality of color conversion tables included in a profile set that corresponds to the selected printing condition among a plurality of profile sets, the plurality of color conversion tables and the color adjustment table being associated with a printing condition applied to the first conversion table on which the color conversion tables and the color adjustment table are based on in each of the profile sets, and the control unit obtains the adjusted CMYK values from the output CMYK values by using the color adjustment table included in the profile set corresponding to the selected printing condition.

24. The non-transitory computer-readable recording medium of claim 23, wherein the printing conditions include a paper type.

* * * * *